United States Patent
Deckert et al.

(10) Patent No.: US 6,332,092 B1
(45) Date of Patent: Dec. 18, 2001

(54) OPTICAL PROBE HAVING AND METHODS FOR UNIFORM LIGHT IRRADIATION AND/OR LIGHT COLLECTION OVER A VOLUME

(75) Inventors: Curtis K. Deckert, Santa Ana, CA (US); Roger L. Hildwein, Woodinville; Robert L. Wilcox, Bothell, both of WA (US)

(73) Assignee: LifeSpex, Incorporated, Kirkland, WA (US)

( * ) Notice: Subject to any disclaimer, the term of this patent is extended or adjusted under 35 U.S.C. 154(b) by 0 days.

(21) Appl. No.: 09/111,174

(22) Filed: Jul. 8, 1998

(51) Int. Cl.[7] ........................................ A61B 1/07
(52) U.S. Cl. ............................................. 600/476
(58) Field of Search ...................... 600/476, 473, 600/310, 478, 130, 133, 160, 176, 178, 179, 180, 182, 920; 385/133, 901, 902

(56) References Cited

U.S. PATENT DOCUMENTS

| | | |
|---|---|---|
| 3,631,852 | 1/1972 | Hay . |
| 3,889,661 | 6/1975 | Fiore . |
| 3,945,371 | 3/1976 | Adelman . |
| 4,350,147 | 9/1982 | Sarrine . |
| 4,415,240 | 11/1983 | Nishioka et al. . |
| 4,500,181 | 2/1985 | Takahashi . |

(List continued on next page.)

FOREIGN PATENT DOCUMENTS

| | | |
|---|---|---|
| 0 280 397 | 8/1988 | (EP) . |
| 0 426 063 A1 | 5/1991 | (EP) . |

(List continued on next page.)

OTHER PUBLICATIONS

Shafi, M.I. and Jordan, J.A., Handbook of Colposcopy, Chapter 4: The Colposcope and Techniques of Colposcopy, Chapman & Hill, London, 1996, pp. 30–36.

(List continued on next page.)

*Primary Examiner*—Marvin M. Lateef
*Assistant Examiner*—Eleni Mantis Mercader
(74) *Attorney, Agent, or Firm*—Dorsey & Whitney LLP

(57) ABSTRACT

A variety of optical probes and optical methods have utility in the examination of various materials, especially materials in the interior of cavities having restricted access through orifices or passageways. An optical probe useful, for example, in examining the epithelia and other tissues of anatomical structures within the body cavities and tubular organs and viscera of mammals is elongated and includes an optical window (240, 302, 1002), a light source (222, 312, 314, 510, 520, 1020, 1200, 1400, 1700), a spatial mixer (224, 304, 2004, 2104, 2204, 2304), and a light collector (210, 320, 720, 1120). The light from the light source is mixed in the spatial mixer, thereby removing any reflected images and irradiation artifacts to achieving uniform diffuse light in the vicinity of the optical window. The light collector receives light from the target through the spatial mixer, but the field of view of the light collector excludes any residual reflections and fluorescence from the spatial mixer. The optical probe may be made of two sections, a reusable section and a disposable section. Disposables (910, 2000, 2100, 2200, 2300) suitable for use with the reusable probe section (900) are elongated and contain a spatial mixing section utilizing an inside surface suitable for the spatial mixing of light, an elongated section extending from the spatial mixing section for mounting the disposable onto the reusable probe section, and a protective window or lens for sealing the reusable probe section from the target. Disposables may be constructed from various low cost materials.

55 Claims, 15 Drawing Sheets

U.S. PATENT DOCUMENTS

| | | |
|---|---|---|
| 4,576,435 | 3/1986 | Nishioka . |
| 4,580,552 | 4/1986 | Nishioka et al. . |
| 4,610,513 | 9/1986 | Nishioka et al. . |
| 4,671,630 | 6/1987 | Takashashi . |
| 4,732,448 * | 3/1988 | Goldenberg ................ 350/96.18 |
| 4,741,326 | 5/1988 | Sidall et al. . |
| 4,878,485 | 11/1989 | Adair . |
| 4,929,070 | 5/1990 | Yokota et al. . |
| 4,930,872 | 6/1990 | Convery . |
| 4,979,498 | 12/1990 | Oneda et al. . |
| 4,994,910 | 2/1991 | Williams . |
| 5,104,392 | 4/1992 | Kittrell et al. . |
| 5,143,054 | 9/1992 | Adair . |
| 5,156,142 | 10/1992 | Anapliotis et al. . |
| 5,209,748 * | 5/1993 | Daikuzono ................ 606/16 |
| 5,251,613 | 10/1993 | Adair . |
| 5,263,110 | 11/1993 | Anderson . |
| 5,341,240 | 8/1994 | Broome . |
| 5,359,453 | 10/1994 | Ning . |
| 5,379,756 | 1/1995 | Pileski et al. . |
| 5,394,863 | 3/1995 | Sanford et al. . |
| 5,399,866 | 3/1995 | Feldman et al. . |
| 5,402,768 | 4/1995 | Adair . |
| 5,452,395 | 9/1995 | Schichman et al. . |
| 5,458,595 | 10/1995 | Tadir et al. . |
| 5,476,090 | 12/1995 | Kishi . |
| 5,489,256 | 2/1996 | Adair . |
| 5,630,784 | 5/1997 | Siegmund et al. . |
| 5,630,788 | 5/1997 | Forkner et al. . |
| 5,634,881 | 6/1997 | Francis . |
| 5,651,783 | 7/1997 | Reynard . |
| 5,700,236 | 12/1997 | Sauer et al. . |
| 5,704,892 | 1/1998 | Adair . |
| 5,730,702 | 3/1998 | Tanaka et al. . |
| 5,835,648 | 11/1998 | Narciso, Jr. et al. . |
| 6,007,225 * | 12/1999 | Ramer et al. ................ 362/554 |
| 6,039,687 | 3/2000 | Storz . |

FOREIGN PATENT DOCUMENTS

| | | |
|---|---|---|
| 0 343 558 B1 | 10/1994 | (EP) . |
| 0 792 618 A1 | 9/1997 | (EP) . |
| 97/14287 A2 | 4/1997 | (WO) . |
| WO 00/74556 A2 | 12/2000 | (WO) . |
| WO 00/78208 A1 | 12/2000 | (WO) . |
| WO 00/78242 A1 | 12/2000 | (WO) . |

OTHER PUBLICATIONS

VanDommelen, Carl H., Choose the Right Lighting for Inspection, in Test and Management World, Oct. 1996, pp. 53–56.

\* cited by examiner

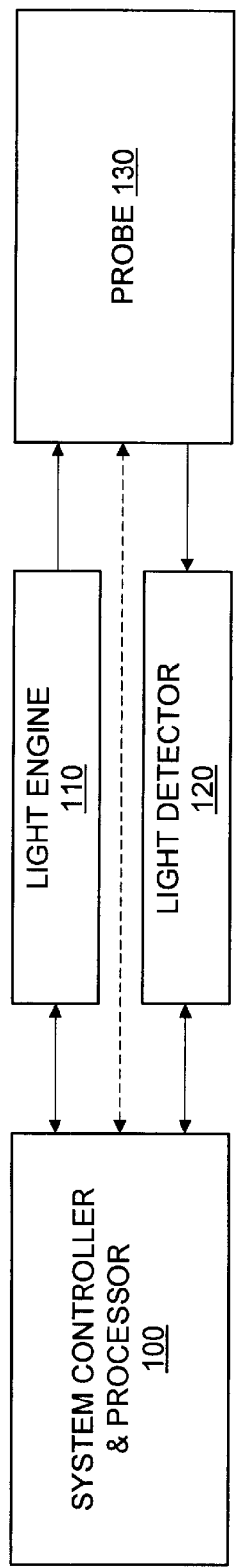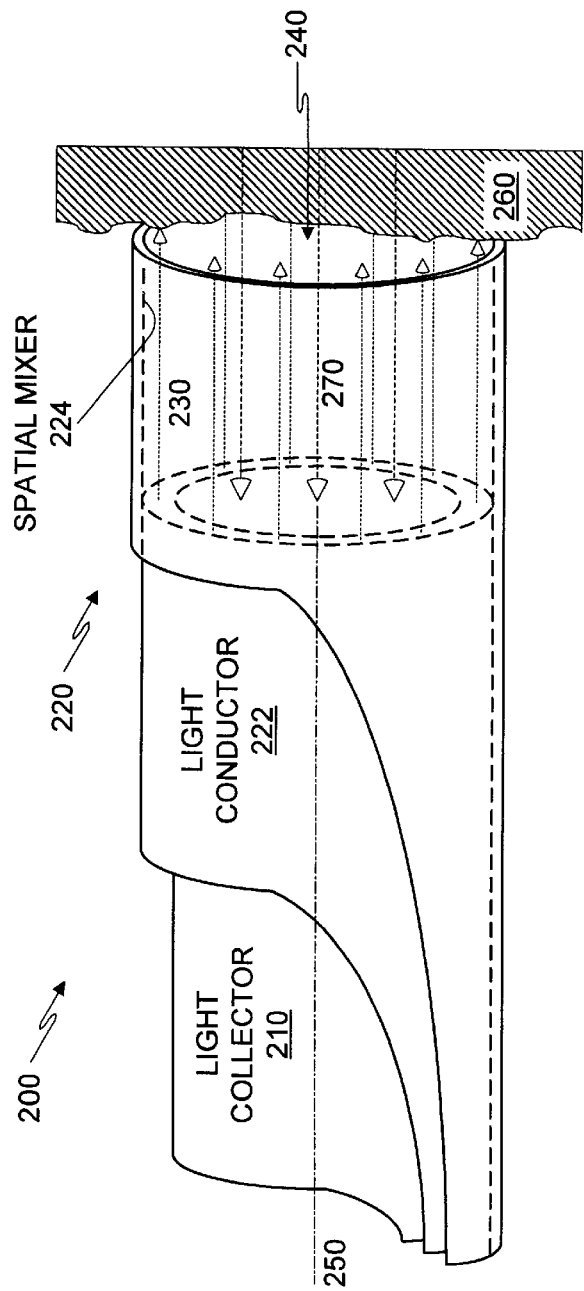

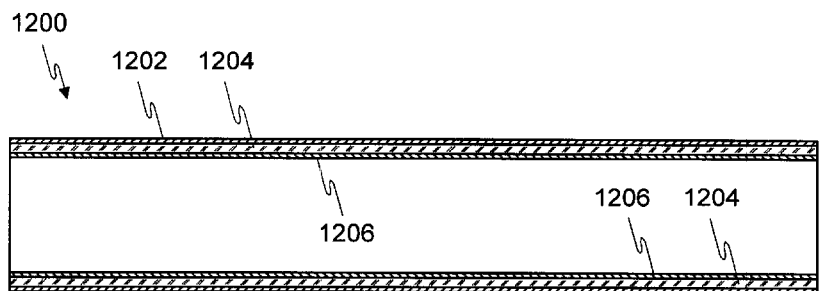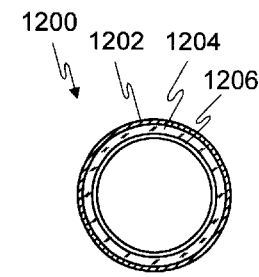
FIG. 12  FIG. 13
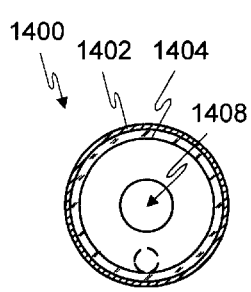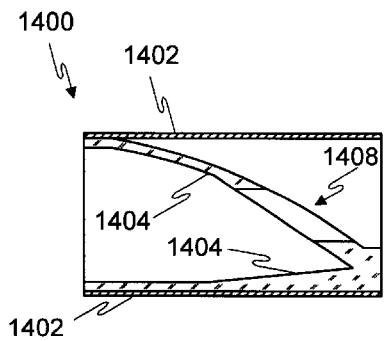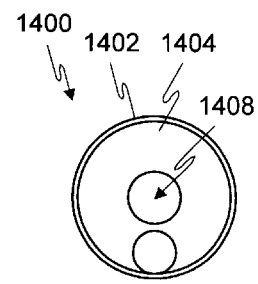
FIG. 14  FIG. 15  FIG. 16
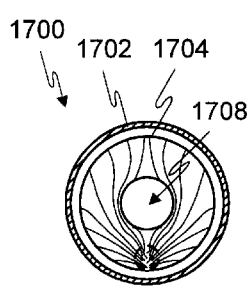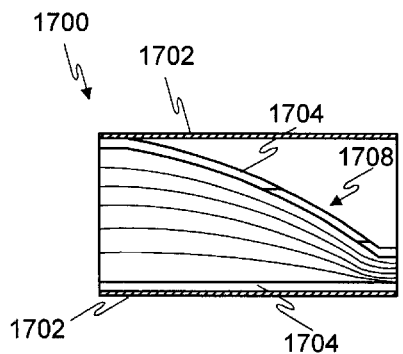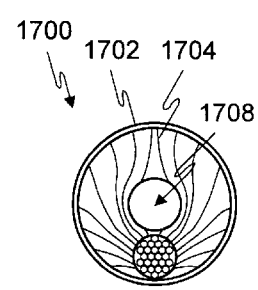
FIG. 17  FIG. 18  FIG. 19

OPTICAL PROBE HAVING AND METHODS FOR UNIFORM LIGHT IRRADIATION AND/OR LIGHT COLLECTION OVER A VOLUME

BACKGROUND OF THE INVENTION

1. Field of the Invention

The present invention relates to optical probes and optical methods, some embodiments thereof being particularly related to optical probes and methods having utility in the examination of material, especially material in the interior of cavities having restricted access through orifices or passageways, and some embodiments thereof being particularly related to optical probes and methods having utility in the examination of the epithelia and other tissues of anatomical structures within the body cavities and tubular organs and viscera of mammals.

2. Description of Related Art

Various apparatus are known for optically probing the interior of cavities of living and non-living bodies. An early inspection apparatus that uses a disposable sheath and which has particular application to the human cervix is described in U.S. Pat. No. 3,945,371 entitled "Apparatus for Inspection and Sampling in Restricted Aperture Cavities Employing Fibre Optics," issued Mar. 23, 1976 to Adelman. The disposable sheath has an upper duct terminating in a protective window for containing either one fiber optic bundle or two fiber optic bundles used in illuminating tissue and collecting a reflected image from the tissue. The light source is a lamp mounted in a reflector that concentrates the light on the end of the fiber optic bundle being used for illumination. By selecting the numerical aperture, or NA, of the fiber materials used in the image collecting fiber optics bundle, different capabilities are achieved. Fiber materials having an NA of 0.56 permit close inspection of the tissues at a viewing distance of 3 mm with low illumination, while fiber materials having an NA of 0.099 permit a general vantage at a viewing distance of 2 cm with high illumination. The possibility of using lenses is mentioned but not elaborated on.

More recently, an optical probe for use in the diagnosis of the tissues of the human cervix using fluorescence and Raman spectroscopies has been described in U.S. Pat. No. 5,697,373 entitled "Optical Method and Apparatus for the Diagnosis of Cervical Precancers using Raman and Fluorescence Spectroscopies," issued Dec. 16, 1997 to Richards-Kortum et al. The probe, which includes 2 excitation fibers and 5 collection fibers, is a type know as "multi-point contact" because it uses discrete collection fibers disposed a substantially fixed distance from the tissue surface to detect fluorescence and/or Raman emissions from tissue regions proximate the distal fiber ends. The fixed distance is maintained by a quartz shield or window which contacts the tissue under investigation. The probe is part of a diagnostic or screening system that includes electromagnetic sources for generating the excitation energy, filters or spectrum analyzers for isolating wavelengths of interest, and computers for processing the wavelengths of interest to determine the tissue properties of interest. Another optical probe using a large number of paired excitation/collection fibers and a shaped contact window is described in U.S. Pat. No. 5,699,795 entitled "Optical Probe for the Detection of Cervical Neoplasia Using Fluorescence Spectroscopy and Apparatus Incorporating Same," issued Dec. 23, 1997 to Richards-Kortum et al. One embodiment uses 31 fiber optic pairs in a bundle while another embodiment uses 357 fiber optic pairs in a bundle.

One disadvantage of the multi-point contact probe is its shallow depth of field, which generally necessitates that the ends of the collection fibers in the distal end of the probe be positioned a short fixed distance from the target. If any portion of the distal end of the contact probe were not properly positioned, the light energy returning from the target would not be accurately detected due to the critical depth-of-field properties of such a probe. Improper positioning of a contact probe can result from operator error or from a target that is angled with respect to the contact probe's distal end to such an extent that full contact cannot be achieved. Another disadvantage of the multi-point contact probe is its limited resolution, which is a practical result of the difficulty and expense of assembling a large number of very fine fibers into a small probe. Yet another disadvantage of the multi-point contact probe is the lack of uniform excitation and collection of emissions due to the necessary spacing-apart of the excitation fibers and the collection fibers at the distal end of the probe.

Optical devices using lenses avoid some of the disadvantages of point contact optical probes in that they typically have better depth-of-field and better resolution. However, achieving uniform light illumination has remained problematic. Many endoscopes have offset illuminating and observing optical systems and suffer uneven illumination produced by the parallax inherent in the offset arrangement. Some endoscopes have coaxially arranged illuminating and observing optical systems to eliminate the non-uniformity introduced by parallax. For example, European Patent Specification number 0 343 558 B1, published Oct. 12, 1994 and entitled "Image Picking-Up and Processing Apparatus" describes an endoscope having an optical fiber bundle arranged such that its end surface surrounds an objective lens used to detect reflected light. However, the illumination achieved by this ring of discrete optical fibers is not uniform. Another type of endoscope described in U.S. Pat. No. 4,671,630 entitled "Illuminating Optical System for Endoscopes," which issued Jun. 9, 1987 to Takahashi, also has coaxially arranged illuminating and observing optical systems to eliminate the nonuniform illumination introduced by parallax. To overcome the non-uniformity of earlier coaxially-arranged illuminating and observing optical systems, Takahashi uses a rectangular parallelopipedal transparent body or prism in front of the objective lens of the observing optical system and introduces light from the side of the prism. Except where the illumination enters, the sides of the prism are reflecting surfaces. Illumination light introduced into the prism is totally reflected on the objective surface due to the difference in the refractive indices of the prism and air and is also totally reflected by the reflecting side surfaces of the prism, but projects out of the object surface due to the higher refractive index of water relative to air in the tissue against which the prism is pressed during normal use. The object surface is thereby directionally illuminated, nearly obliquely so, which exaggerates shadows from irregularities in the tissue and permits a strong stereoscopic image to be achieved. While this type of illumination may be useful for observation by reflected light, its usefulness for observations based on light interactions with tissue other than reflectance is not described. Another type of endoscope described in U.S. Pat. No. 5,700,236 entitled "Endoscope Attachment for Changing Angle of View," which issued Dec. 23, 1997 to Sauer et al., uses a sheath having a distal portion that contains structure for changing the angle of view and/or illumination angle of an endoscope. Structure for changing the view angle include a prism, and structure for changing the illumination angle include a prism, a curved light guide, and an angled optical fiber. However, the illumination achieved by the discrete optical fibers is not uniform for typical light interaction analysis. No measures are described for achieving uniform light using the alternative techniques.

SUMMARY OF THE INVENTION

A need, therefore, exists for apparatus and methods of providing uniform irradiation for observation involving light interactions with tissue other than reflectance or in addition to reflectance. For example, while diagonal illumination as described in the aforementioned Takahashi patent may be suitable for use with optical systems that observe reflected light, it is not effective for use with optical systems that are designed to observe light coming from within a target. For example, the aforementioned Richards-Kortum '373 patent describes systems based on cell fluorescence and/or Raman scattered light, both of which are attributable to light that emanates from within tissue cells and not light reflected from the tissue surface. Optical systems having parallax or producing non-uniform or highly angled light relative to the target surface are not optimal for fluorescence and Raman-based systems, which require uniform diffuse light irradiation capable of penetrating into the target for quantitative or qualitative analysis. Accordingly, an object of the present invention in various of its embodiments is to front-irradiate target materials with light that is uniform and diffuse with many near-normal rays relative to the general orientation of the target surface, throughout a field of view of the light detection system.

Another object of the present invention, in various of its embodiments, is to provide an irradiation system that uses a separate optical probe section, whether reusable, disposable, or single use, to contact target materials. Some components of the irradiation system are incorporated into the separate section of the optical probe while other components of the light delivery system are incorporated into a reusable section of the optical probe.

Another object of the present invention, in various of its embodiments, is to incorporate only low cost components of an irradiation system into a disposable or single-use section of the optical probe, while other components of the irradiation system, including high cost components, are incorporated into the reusable section of the optical probe.

These and other objects are achieved in various embodiments of the present invention. One embodiment of the present invention is an optical probe having a distally disposed optical window, comprising a light collector, a light source, and a spatial mixer. The light collector has an axis of light collection passing through the optical window and a focal plane generally proximate the optical window. The light source has a light projection pattern about the axis of light collection. The spatial mixer has a proximal end in optical communication with the light source, a distal end in optical communication with the optical window, and an axis of light projection passing through the optical window. The spatial mixer also has a light mixing surface that is partially intersected by the light projection pattern of the light source to establish a distribution of irradiation ray angles proximate the optical window that has a maximum away from normal and near-normal to the axis of light projection. In a variation thereof, the light mixing surface is partially intersected by the light projection pattern of the light source to establish a distribution of irradiation ray angles proximate the optical window that has a maximum near-parallel to the axis of light projection.

Another embodiment of the present invention is an optical probe for examining, through an optical window therein, living tissue in the interior of cavities having restricted access through orifices or passageways, comprising a body, a lens system, a light source, and an elongated inside surface. The body has an elongated distal section containing the optical window, and a proximal section. The lens system is mounted in the body and has an optical axis passing through the optical window of the probe and a focal plane lying generally proximate to the optical window. The light source is mounted in the body about the lens system and is coaxial with the lens system with a direction of light projection generally toward the optical window. The elongated inside surface has one end disposed generally about the light source and another end disposed generally about the optical window, the inside surface comprising a light scattering surface and the light projection at least partially intersecting the light scattering surface to establish a distribution of ray angles proximate the optical window that has a maximum near-parallel to the optical axis of the lens system.

Yet another embodiment of the present invention is a disposable for an optical probe, the disposable having a distal end to contact a target having a fluid associated therewith and a proximal end to mount to a reusable optical probe section. The disposable comprises a body having a mounting surface toward the proximal end and a light mixing inside surface toward the distal end, and an optical window element disposed within the body. The optical window element and the body proximal of the optical window element are barriers to the fluid.

BRIEF DESCRIPTION OF THE DRAWINGS

FIG. 1 shows schematically the basic elements of an illustrative system for the optical examination of materials.

FIG. 2 shows schematically the principal elements of an optical probe that is suitable for use with the system of FIG. 1 to probe material in the interior of cavities having restricted access through orifices or passageways for other means of examination.

FIGS. 12–19 are views of various alternative light or radiation guide components for the optical probes of FIGS. 10 and 11, including cross-section views along the optical axes thereof and corresponding end views.

DETAILED DESCRIPTION OF THE PREFERRED EMBODIMENT

Figure 3:
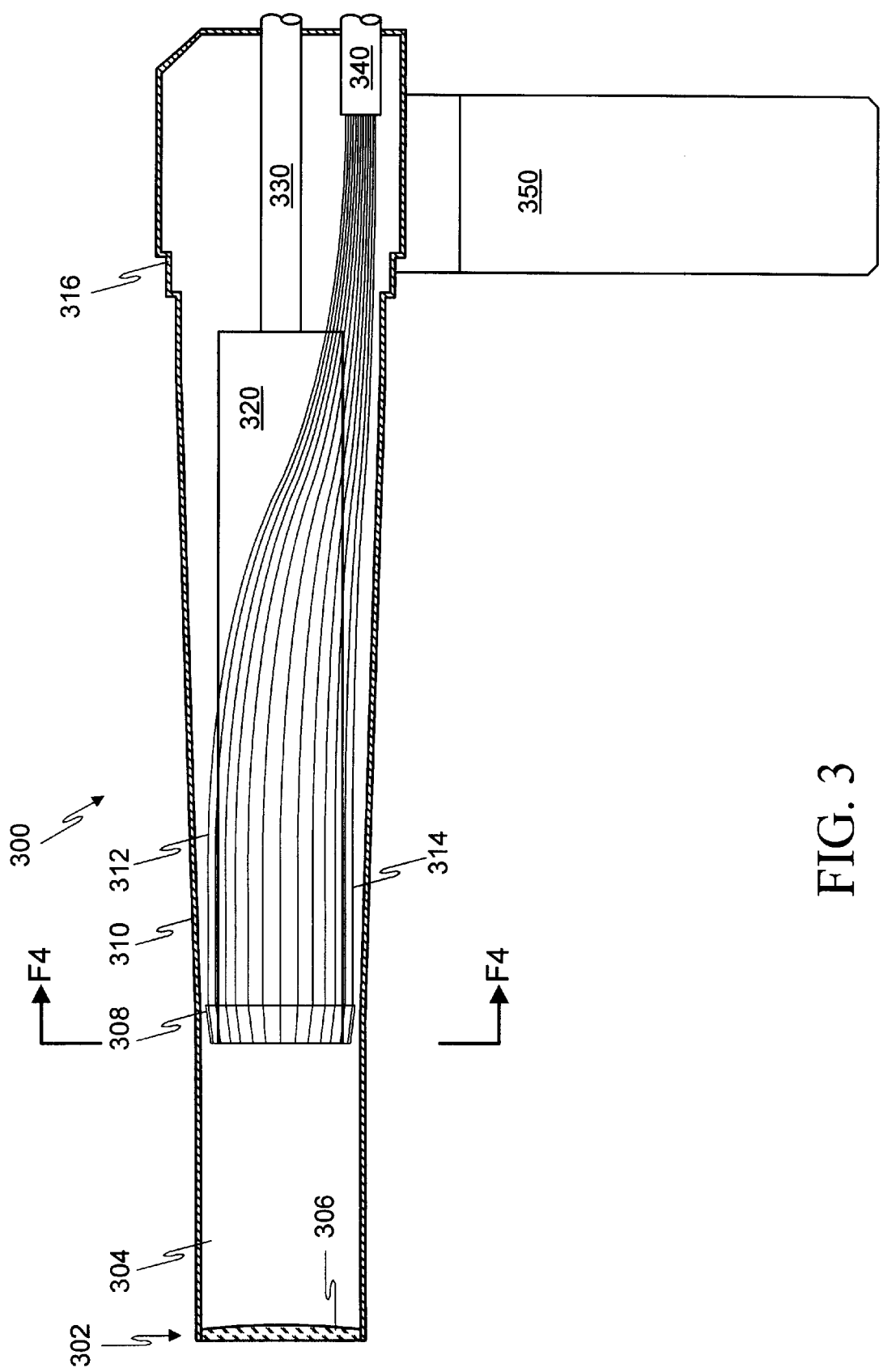
FIG. 3 is a plan cutaway side view of an optical probe illustrating basic elements of an irradiation system, the probe being suitable for viewing, analyzing and/or treating material in the interior of cavities having restricted access through orifices or passageways.

FIG. 1 shows schematically the basic elements of an illustrative optical system for the examination of materials. As used herein, optics refers to the branch of physics that deals with the generation, propagation, and detection of electromagnetic radiation having wavelengths greater than x-rays and shorter than microwaves, and light refers to electromagnetic radiation at one or more wavelengths (narrowband, broadband, or any combination thereof) anywhere in the electromagnetic spectrum greater than x-rays and shorter than microwaves. An optical probe 130 is used to irradiate the material being examined (i.e. the target) and for collecting radiation from the target due to the irradiation. A system controller and processor 100 controls the various operations performed by the system and processes various characteristics of the radiation image collected from the target to obtain multispectral indications about various properties of the target material. Where the material is mammalian tissue which may suffer one or more abnormalities, the system controller and processor 100 may use appropriate algorithms to determine whether the tissue is normal or abnormal, including the type of abnormality, and display the result; or use appropriate algorithms to calculate a probability of the tissue being normal or abnormal and, if abnormal, a probability of the type of abnormality, and display the result; or use appropriate algorithms to screen the tissue for abnormality and display the result; or control the power, duration, and other characteristics of light projected onto the tissue for treating tissue abnormality; or a combination of the foregoing. A light engine 110 includes one or more electromagnetic energy sources for generating specific irradiation wavelengths. A light detector 120 includes such components as filters and detectors or a spectrum analyzer for measuring the amplitude of wavelengths of interest in the probe image over the field of view of the probe 130. The system controller and processor 100 is coupled to the light engine 110 and light detector 120 to control the various operations thereof The light engine 110 and light detector 120 are coupled to the optical probe 130 using any suitable means such as fiber optic cable, although other coupling techniques such as liquid light guides may be used instead. If desired, various of the components of the light engine 110, the light detector 120, or both may be integrated into the probe 130, in which case various hardwired or wireless techniques may be used to couple the system controller and processor 100 to the probe 130. If the probe 130 contains any controllable or powered components, the probe 130 may be connected to the system controller and processor 100 to receive control signals and/or power and/or furnish status signals. Examples of systems for the optical examination of mammalian epithelial tissues include U.S. Pat. No. 5,697, 373 entitled "Optical Method and Apparatus for the Diagnosis of Cervical Precancers using Raman and Fluorescence Spectroscopies," issued Dec. 16, 1997 to Richards-Kortum et al., and U.S. patent application Ser. No. 08/666,021 entitled "diagnostic Method and Apparatus for Cervical Squamous Intraepithelial Lesions in Vitro and in Vivo Using Fluorescence Spectroscopy," filed Jun. 19, 1996 in the name of Richards-Kortum et al., which hereby are incorporated herein in their entirety by reference thereto.

FIG. 2 shows schematically the principal elements of an optical probe 200 that is suitable for use in the system of FIG. 1 to probe material in the interior of cavities having restricted access through orifices or passageways, such as, in the case of mammals, the epithelia and anatomical structures within their body cavities and tubular organs and viscera. For access to tissue within generally tubular cavities, the probe 200 preferably is elongated and generally cylindrical (including round, oval, and elliptic), and includes a light collector 210 and an irradiator 220, which in turn includes a light conductor 222 and a spatial mixer 224. Other geometric shapes may be used for the probe 200 and/or for the light collector 210, the light conductor 222, and the spatial mixer 224, as required for the application, including triangular, rectangular, hexagonal, octagonal, other multiple facet geometries, and so forth. Moreover, the principles of the probe 200 may be used for applications such as surface applications not requiring access to the interior of cavities, in which event the overall shape of such probes may be made suitable for the application and need not be elongated.

Probe output efficiency is maximized by having the irradiation and collection paths essentially separate except for a shared path at the optical window 240 and through a portion of the irradiator 220. For example, the light conductor 222 emits light toward a target 260 from around the periphery of the light collector 210, as shown in greatly simplified form for illustratively a ring source by rays 230. The light collector 210 collects light from the target 260 as represented by rays 270. Light from the light conductor 222 partially intersects the spatial mixer 224 as it passes through (not shown here; see, e.g., FIG. 5), which mixes the light to remove any reflected images and irradiation artifacts therein. The field of view of the light collector 210 preferably is such that any residual reflections and fluorescence from the spatial mixer 224 are excluded from collection. While the window 240 may be just an opening, an optical element such as a solid flat optical window, a sheet of pliable material, a shaped lens, a conformal window such as a window having a nipple shaped to conform to the Os of the cervix, or a fluid filled sac, or a combination of one or more of such optical elements may be used at the position of the window 240 and/or inside of the spatial mixer ahead of the light collector 210 and light conductor 222 to achieved certain desired mechanical and/or optical effects. A conformal window is described in, for example, U.S. Pat. No. 5,699,795, issued Dec. 23, 1997 to Richards-Kortum et al. and entitled "Optical Probe for the Detection of Cervical Neoplasia Using Fluorescence Spectroscopy and Apparatus Incorporating Same," which hereby is incorporated herein in its entirety by reference thereto. While any such solid window or lens would be shared by the light collector 210 and irradiator 220, which preferably are designed to take into account any optical effect thereof, the effect of any such solid window or lens on optical efficiency is minor compared to efficiency loses suffered by optical systems that use a beam splitter or a dichroic mirror in the optical path. Moreover, beam splitters and dichroic mirrors tend to generate large amounts of stray light as compared with the partially common irradiation and collection paths of the probe 200.

During normal use, the probe 200 is brought into contact with the target generally at the optical window 240. The irradiator 220 projects light along an optical axis of projection coincident with an axis 250 which uniformly irradiates a specific surface region of the target material and penetrates into a volume of the target material through the irradiated surface. The light collector 210 uniformly collects light from this volume along an optical axis of collection coincident with the axis 250. While the optical axis of projection and the optical axis of collection preferably are coincident (e.g. axis 250) to achieve symmetry, this is not a necessary condition provided that the irradiation is sufficiently uniform over the collection volume.

The light from the irradiator 220 preferably is stable, uniform, and due to interactions with the spatial mixer 224, diffuse (rays of the light intersecting the target at a multiplicity of angles and from a multiplicity of directions). The diffuse nature of the light improves its ability to penetrate into the target, including into areas of the target which are blocked from receiving normal radiation, with the distribution of ray angles relative to the axis of light projection from the irradiator 220 being selected based on the overall nature of the target material. For example, where the target is the human cervix and high irradiation efficiency is desired for excitation of weak emissions such as fluorescence and Raman, preferably the distribution of ray angles has a maximum near-parallel to the axis of projection, with a small percentage of the rays being parallel and essentially none of the rays being highly deviant from parallel. However, a distribution of ray angles having a maximum at a much greater degree of deviance from parallel is desirable for some other applications, especially applications in which the surface of the target is moderately to severely irregular. A distribution of ray angles having a maximum near-normal to the axis of projection is undesirable, since such light does not penetrate sufficiently into the target. The specific distribution of ray angles in the light projected from the irradiator 220 depends on the material or materials used for and geometry of the spatial mixer 224 as well as the angles of the rays 230 emitted by the light conductor 222.

The light collector 210 has a field of view of about the size of the optical window 240, a generally uniform collection efficiency over its field of view, and a focal plane in the vicinity of the optical window 240 having a good depth of focus. Preferably, the light collector 210 is a telecentric lens system or near-telecentric lens system, which is particularly suitable because of its uniform collection efficiency and longer effective depth of focus without appreciable distortion for applications involving low level responses such as fluorescence spectroscopy of mammalian epithelia, as described in the aforementioned Richards-Kortum patent documents. However, other types of optical collectors that have an adequate field of view may be used, if desired, provided that the collected light is compensated for non-uniformity across the field of view and that any excessive spatial distortion is also compensated for. Preferably, the light collector 210 is color corrected for multi-spectral analysis, and any collection non-uniformity is compensated for by the use of well known normalization algorithms or by well known optical corrections such as the use of a bull's eye filter. The light collector field of view and depth of focus can vary a great deal for applications related to cervical and other tissues as well as non-medical applications.

Although the distal surface of the light conductor 222 is shown in FIG. 2 to be in the same plane as the distal surface of the light collector 210, it may be further extended distally from this plane or recessed from this plane with adequate means of light transmission to the target.

While the probe 200 may be configured and dimensioned as desired so as to be useful for probing different types of material, organic and inorganic, the optical probe 200 may be configured and dimensioned for use in diagnosing and/or screening cancerous and pre-cancerous tissues of mammalian epithelia using fluorescence spectroscopy in the manner described in the previously cited Richards-Kortum patent documents. FIG. 3 shows an optical probe 300 that is based on the generalized probe 200 and is configured and dimensioned for probing tissues of the human cervix in the diagnosis of cancers and precancers using tissue fluorescence. In this medical application, the optical probe 300 emits a uniform light with a generally normal but somewhat diffuse orientation in the ultraviolet range, the visible range, or both through an optical window 302 which forms the distal end of the probe 300 to excite tissue into fluorescence within a cylindrical volume, and collects the low level tissue fluorescence through the optical window or probe distal end 302 from a cylindrical volume that extends into the tissue substantially concentric with the excited cylindrical volume. In the case of cervical examination, the field of view preferably is about 25 mm and the depth of focus is preferably about 8 mm.

The probe 300 has a housing (shown in cross section) that includes a generally cylindrical projecting distal end section 310 and a proximal end section 316 from which fiber optic bundles 330 and 340 extend. The distal end section 310 is generally cylindrical and illustratively about 10.8 inches (about 27.4 cm) in length and about an inch (25 mm) in internal diameter at the probe distal end 302. The distal end section 310 is slightly flared in a direction away from the probe distal end 302 to accommodate bulging of the fibers of the bundle 340 about the lens system 320; illustratively, the flare is about 2.5 degrees beginning at a point about 10.7 cm (4.2 inches) from the window. Preferably, the dimensions of the distal end section 310 allow probe clearance through a speculum or other such devices. The distal end section 310 and the proximal end section 316 may be constructed as one piece or separate pieces connected in any desired manner, as by being threaded and screwed together, welded, joined with adhesive, clamped together, and so forth. The proximal end section 316 is of any convenient shape for housing the fiber optics bundles 330 and 340. While optical probes generally may be supported in any convenient manner such as by a suitable mechanical support, the probe 300 is designed to be hand-held and includes a suitable handle 350. Illustratively, the handle 350, which has a yoke portion and the proximal end section 316 is of any suitable shape for receiving the yoke portion, which is rotatably connected to the distal end section 316 with screws 430 and 432 (FIG. 4) or any other suitable connector and extends illustratively about 7.5 inches from the proximal end section 316. Alternatively, the handle 350 may be fixed to the proximal end section 316 or may be part of the proximal end section 316. Any materials suitable for the application may be used for the probe 300. For example, for cervix examinations, the distal and proximal end sections 310 and 316 may be made of commonly available stainless steel such as type 304 or equivalent or type 6061T6 aluminum that is hard black anodized. The handle 350 may also be made of type 6061T6 aluminum or other suitable material with or without plating or coating. All aluminum components may also be gold anodized or coated with any suitable plating or coating. Many other materials are suitable for various parts of the probe 300. For example, in medical applications the distal end section 310 which contacts the patient may be made of any of various medically approved materials, including rigid plastics, pliable plastics, and paper, while other parts such as the handle may be made of rigid plastic, dense core foam, and so forth. Moreover, the handle 350 and/or the proximal end section 316 of the probe 300 may be coated with non-slip materials for easier handling, while the distal end section 310 may be coated with slippery materials to reduce friction during insertion.

Irradiator

Figure 4:
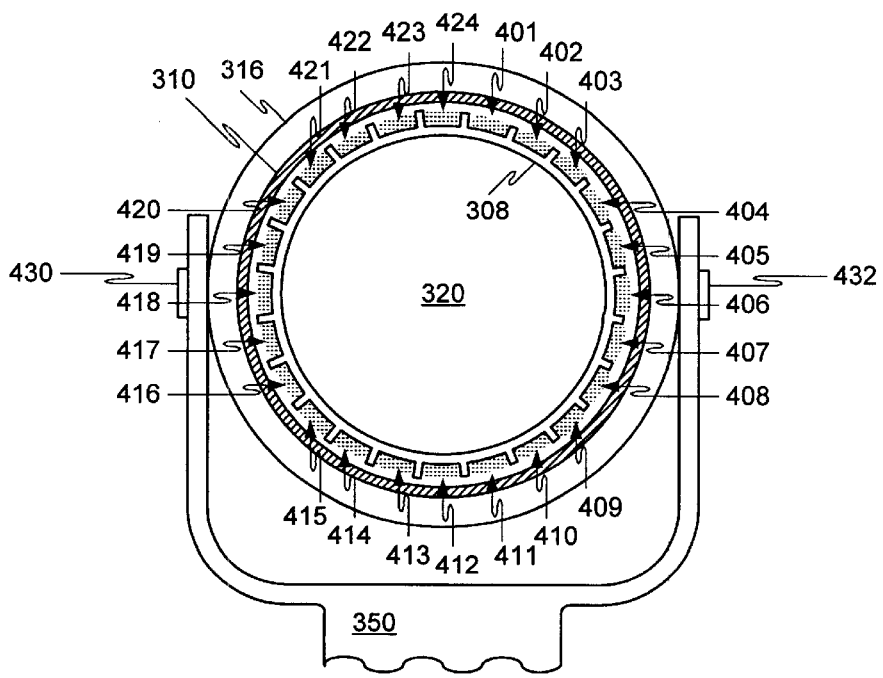
FIG. 4 is a cross-section of the optical probe of FIG. 3 taken normal to the optical axis thereof near a ring light source within the irradiation system, which illustrates in cross-section the output of the ring radiation source.
Figure 5:
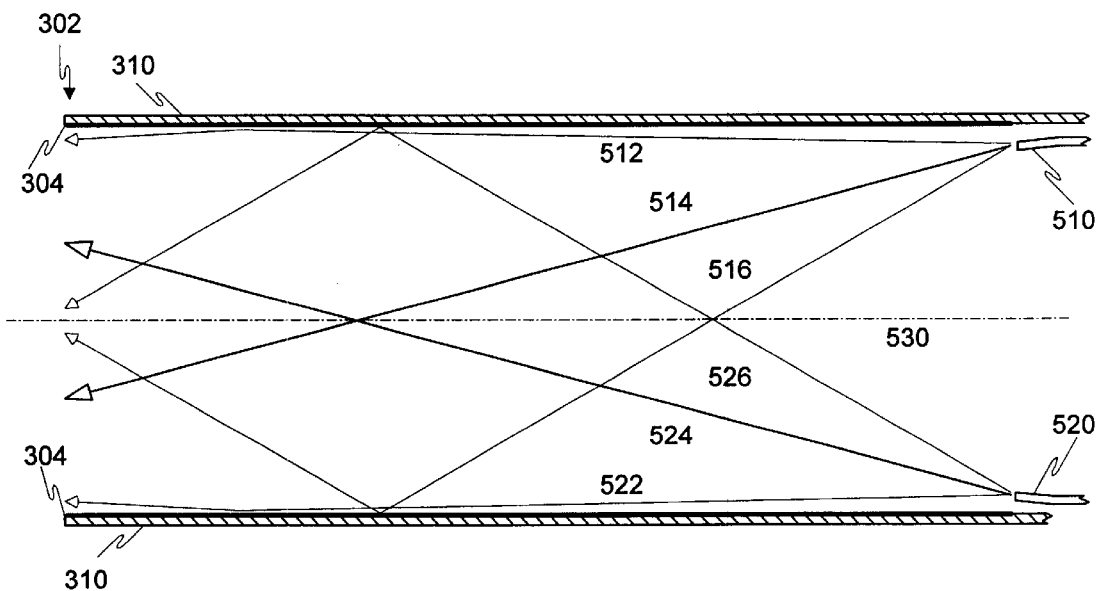
FIG. 5 is a cross-section of the optical probe of FIG. 3 taken along the optical axis thereof and through the irradiation optical path, the collection optical path, and a spatial mixer contained therein, and which shows the behavior of various exemplary rays in the irradiation path.

FIGS. 3, 4 and 5 show various components of one type of irradiator for the optical probe 300. FIG. 3 is a side cutaway view of the optical probe 300. FIG. 4 is a cross-sectional view taken normal to the optical axis of the optical probe 300 just in front of the distal ends of numerous optical fibers of the bundle 340, two of which are referred to by the reference numbers 312 and 314 (FIG. 3). FIG. 5 is a cross-sectional view taken along the optical axis of the optical probe 300 and through part of the distal end section 310. The probe 300 terminates in a lens 306 at its distal end 302, although the lens 306 may be positioned anywhere in-between the distal end 302 of the probe 300 and the distal end of the fibers of the bundle 340 or omitted entirely. The fiber optics bundle 330 from a lens system 320 and the fiber optics bundle 340 pass through the back of the proximal end section 316 for connection to a light detector 120 (FIG. 1) and a light engine 110 (FIG. 1) respectively. The fibers of the bundles 330 and 340 extend continuously to the light detector 120 and the light engine 110 respectively to achieve high efficiency, although the bundles 330 and/or 340 may be segmented with intervening connectors located, for example, at or near the back of the proximal end section 316.

The bundle 340 contains fiber optics for illuminating the target, illustratively twelve hundred fibers, each being approximately 0.2 mm in diameter and having a numerical aperture of, illustratively, 0.28. Suitable fibers are available from a variety of sources, including Ceramoptec Inc. of East Longmeadow, Mass., under the product designation Optran. Illustratively, the fibers of the bundle 340 are separated into twenty-four groups 401–424 (FIG. 4) of approximately fifty fibers each, the groups 401–424 being routed along the outside surface of the lens system 320 from the fiber bundle 340 to evenly-spaced annular positions on a toothed annular form 308 about the distal end of the lens system 320 to form a ring light source. During manufacture, the fibers of the bundle 340 are held in place about the casing for the lens system 320 using various tooling and then potted in a manner well known in the art using preferably non-fluorescent potting material. The gathering of the fibers near the proximal end of the lens system 320 causes a bulge on one side of the probe 300 that is accommodated by the flaring of the distal end section 310. Note that the irradiation fibers 310 may be bundled for connection to the light engine in other ways. For example, the fibers may be gathered into two or more separate bundles rather than into the single larger diameter bundle 340, which would reduce the amount of bending of the individual fibers and result in less bulging.

As a further example, the fibers may also be arranged coaxially about the fiber bundle 330. Note also that the use of twenty-four groups 401–424 is illustratively, and more or fewer groups containing more or fewer fibers may be used as desired. The fibers need not be grouped, but may be continuously arranged about the inside of the body 304, if desired. The fibers may be randomized to provide some mixing of any spatial definition from the light engine. Note that the fibers of the bundle 340 may be held in place on the casing of the lens system 320 by other techniques, such as by other suitable adhesives and even mechanical retainers before being ground and polished on the ends. Alternatively, the fibers of the bundle 340 may be mounted on the inside surface of the distal end section 310 (not shown), or may be mounted on a form (not shown) that is disposed between the distal end section 310 and the lens system 320. The outside generally cylindrical surface formed by the potted fibers from the bundle 340 on the lens system 320 is wrapped with Teflon® tape to facilitate probe assembly, although a variety of other coatings and covering materials may be suitable as well.

The form 308 on the distal end of the lens system 320 serves to angle the distal ends of the fibers of the bundle 340 at about ten degrees toward the optical axis of the lens system 320. During manufacture, the angled fibers are sliced normal to the optical axis of the lens system 320 and ground and polished in a well-known manner to achieve surfaces that are themselves angled about ten degrees relative to the respective axes of the fibers of the bundle 340. Any suitable anti-reflective coating may be applied to the ends of the fibers to increase transmission efficiency. As a result of this geometry, the center of the light cone emitted from the end of each fiber of the bundle 340 is angled about fifteen degrees toward the optical axis of the lens system 320.

The optical probe 300 also includes a spatial mixer, which is implemented by providing a particular finish to or applying a particular material to the inside wall 304 of the distal end section 310. Generally, the surface 304 forming the spatial mixer is a substantially non-fluorescing material having or having been finished to have high diffuse reflectivity in preferably the ultraviolet and visible wavelengths and to strongly forward-scatter the wavelengths of light exiting the distal ends of the fibers of the bundle 340. For example, where the distal end section 310 is a stainless steel tube, the spatial mixer surface 304 is achieved by grinding and honing the inside of the tube to achieve a suitable surface finish, illustratively an 8 to 16 microinch (0.2 to 0.4 micrometer) finish, and then electropolishing or chemically polishing the finish to improve uniformity and efficiency and to reduce backscatter. Alternatively, the spatial mixer 304 may be aluminum, metal, mylar, or other type of foil that has suitable surface properties and is made to line the inside of the distal end section 310. The specific property for the spatial mixer surface 304 is determined by balancing reflection efficiency on the one hand and uniformity and diffusivity on the other hand. Hence, even near-specular finishes on the order of 4 microinches (0.1 micrometer) may be suitable in some arrangements, although care should be taken when using near-specular finishes not to re-image the output of the fibers 310 at the target from the spatial mixer surface 304. In other arrangements, a surface finish greater than 16 microinches (0.4 micrometers) may be suitable where greater uniformity is required and efficiency is less of a concern.

Most of the light from the distal ends of the fibers of the bundle 340 is directed toward the probe distal end 302, but the light spreads with a half angle of about sixteen degrees so that some light initially encounters the spatial mixer surface 304 and is forward-scattered to augment light intensity generally in the periphery of the field of view of the lens system 320 and to add an additional profusion of ray angles to the light at the probe distal end 302, thereby causing a uniform diffuse light to occur in the vicinity of the probe distal end 302. Hence, some number of reflections of light rays within the spatial mixer 304 is desirable. However, reflecting too much of the light too many times would result in reduced irradiation efficiency because multiply reflected light would suffer attenuation in the spatial mixer 304. Such multiply reflected light is undesirable unless adequate power is available from the light engine 110. An excessive number of reflections would result in an increasing number of rays being nearly parallel to the general orientation of the target surface in the vicinity of the probe distal end 302. Such rays would fail to penetrate sufficiently deeply into the target (e.g., tissue) to excite fluorescence throughout the desired volume of material.

A lens 306 is positioned at the distal end 302 to serve as the optical window of the probe 300. The lens 306 is provided with any suitable surface contour and is made of any suitable material or combination of materials having good optical properties and low fluorescence, such as ground glass, quartz, fused silica, or molded acrylic such as type EXP-X72 available from CYRO Industries, Inc. of Rockaway, N.J., which is a non-additive version of the company's type S-10 Acrylite® acrylic molding compound. The lens 306 may have any desired antireflective ("A/R") coating on either surface or on both surfaces, and any other characteristics as required by the lens system 320. The lens 306 is sealed to the inside wall of the distal end section 310 to protect the fibers of the bundle 340, the lens system 320, and other internal components of the probe 300 from contamination and damage during use.

When placed at the distal end 302 of the probe 300 as shown, the lens 306 is able to contact and compress the target. However, the lens 306 may be spaced away from the distal end 302 of the probe 300, either near the distal end of the lens system 320 and the ends of the fibers of the bundle 340 (see, e.g., FIG. 7), or positioned anywhere between the distal end 302 of the probe 300 and the distal end of the lens system 320. Positioning a lens near the distal end of the fibers of the bundle 340 and spaced away from the ends of the fibers of the bundle 340 by any suitable distance, e.g. less than about 8 mm and preferably about 1 mm, places any reflected image of the distal end of the fibers of the bundle 340 outside of the field of view of the lens system 320, thereby avoiding any adverse impact such a reflected image may have on the light sought to be collected. For example, a reflected image from a light source seriously impacts the detection of a reflection image of the target since the wavelength or wavelengths of both reflections would be the same. However, a reflected image from a lens has less impact on the detection of a fluorescence or Raman emission, since the wavelength or wavelengths of a fluorescence or Raman emission differ from that of the reflected image and are typically isolated by bandpass filters or a spectrograph. Positioning a lens further from the distal end of the fibers of the bundle 340 requires the use of a very good anti-reflective coating on the lens or the use of other appropriate techniques to avoid generating a reflected image of the distal end of the fibers of the bundle 340.

FIG. 5 is a longitudinal cross-section through the spatial mixer 304 of the optical probe 300 (lens 306 omitted for clarity), and shows the behavior of various exemplary rays of light therein. The spatial mixer 304 is illustratively about 65 mm in length and about 25 mm in diameter. The angled distal ends of the fibers of the bundle 340 bias light toward the center of the field of view of the lens system 320, as represented by ray 514 which emanates from an illustrative fiber 510, and by ray 524 which emanates from an illustrative fiber 520. Light spreads out in a roughly symmetrical conical pattern from each fiber in a well understood manner, as from the ends of the illustrative fibers 510 and 520 as represented by rays 512 and 516 and rays 522 and 526 respectively. The spatial mixer 304 functions by redistributing a portion of the solid angle emitted by each of the fibers of the bundle 340, as represented by the forward scattered components of rays 512, 516, 522 and 526, resulting in spatial mixing onto the target at or near the probe distal end 302. This redistribution as well as the angled direct light represented by rays 514 and 524 achieve a multiplicity of ray angles in the vicinity of the probe distal end 302. Most of the rays are near-parallel to the optical axis 530 of the light detector (not shown) with some rays at the edge of the probe distal end 302 being parallel to the optical axis 530, so that light efficiently penetrates into the target (e.g., tissue).

The various components and materials used in the irradiation system of the optical probe 300 are selected to be capable of handling the irradiation power desired. For example, one use of the optical probe 300 for examination of the human cervix involves power out of the probe distal end 302 to range from about 20 to 50 mW at 337 nm, 380 nm, and 460 nm. Systems with power on the order of about 100 mW or greater may be used if desired to reduce total integration times. Illustratively, the spatially mixed light from the probe 300 penetrates up to about 300 microns into the cervical tissue, depending on wavelength, to excite fluorescence therein. The optical probe 300 may also be used for applying light treatment to tissue, which can involve higher power levels up to the tolerance level of the tissue. However, non-tissue applications may involve even higher power levels, so that the components and materials of the irradiation system used in such applications should be selected accordingly.

Light Collector

Figure 6:
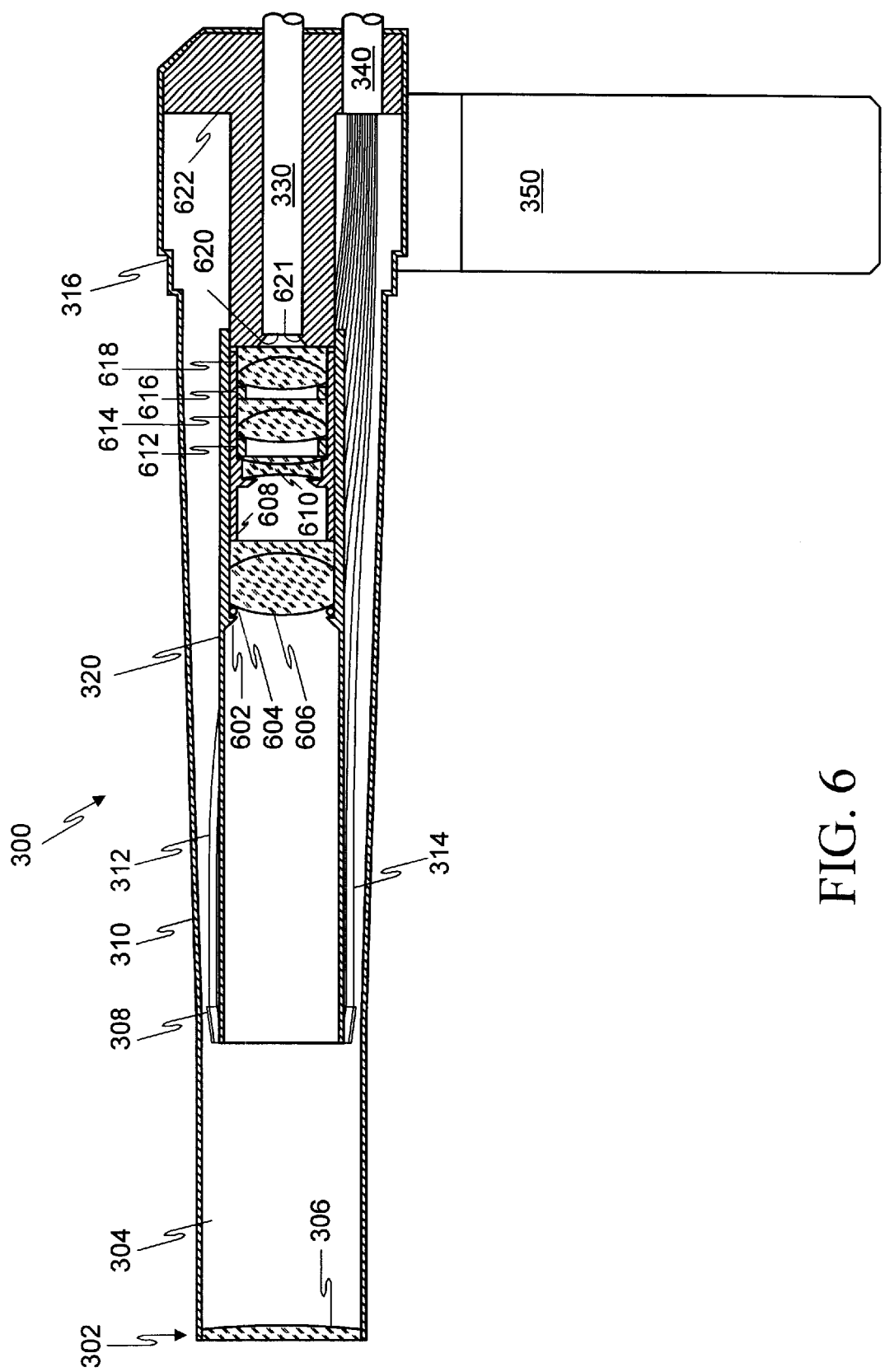
FIG. 6 is a plan side cutaway view of the optical probe of FIG. 3 illustrating basic elements of a radiation collection system along with some elements of the irradiation system.

FIG. 6 is a plan side cutaway view of the optical probe 300 of FIG. 3 showing various components of the lens system 320 having the plano-convex lens 306 at the probe distal end 302. The use of lens 306 in conjunction with the lens system 320 forms a true telecentric lens system, the lenses of which illustratively are as follows. Lens 306 is a plano-convex silica lens having a diameter of 25.4 mm, a thickness of 4.0 mm (lens thickness being measured along its optical axis), a distal surface radius of infinity, and a proximal surface radius of 91.69 mm. Lens 606 is a cemented doublet acromat with a convex-convex element of BAF10 glass having a diameter of 19.0 mm, a thickness of 11.4 mm, a distal surface radius of 24.47 mm, and a proximal surface radius of 16.49 mm, and a concave-convex element of FD10 glass having a diameter of 19.0 mm, a thickness of 3.0 mm, a distal surface radius of 16.49 mm, and a proximal surface radius of 131.65 mm. Lens 610 is a cemented negative doublet acromat with a concave-concave element of BK7 glass having a diameter of 12.5 mm, a thickness of 2.0 mm, a distal surface radius of 30.83 mm, and a proximal surface radius of 23.47 mm, and a concave-convex element of SF5 glass having a diameter of 12.5 mm, a thickness of 1.6 mm, a distal surface radius of 23.47 mm, and a proximal surface radius of 69.20 mm. Lens 614 is a cemented doublet acromat with a convex-convex element of BAF11 glass having a diameter of 15.0 mm, a thickness of 6.3 mm, a distal surface radius of 17.97 mm, and a proximal surface radius of 11.20 mm, and a concave-convex element of SF10 glass having a diameter of 15.0 mm, a thickness of 1.8 mm, a distal surface radius of 11.20 mm, and a proximal surface radius of 85.31 mm. Lens 618 is a cemented doublet acromat identical to lens 614. Suitable spacers 608, 612 and 616 and other structures such as flange 602 are used to keep the lenses 606, 610, 614 and 618 in place and properly spaced apart, and a resilient O-ring 604 is used against lens 606 to seal the chamber containing the lenses 606, 610, 614 and 618. Illustratively, the spacing between lenses 306 and 606 is 142.50 mm, between lenses 606 and 610 is 11.03 mm, between lenses 610 and 614 is 3.34 mm, between lenses 614 and 618 is 1.00 mm, and between lens 618 and an image plane 620 at the end surface of the fiber bundle 330 is 3.00 mm. The lens 306 and lens system 320 is focused at a object point about 1 mm beyond the distal end of the probe 300 and into the target, and is designed to focus the target image onto the image plane at the end of the fiber bundle so as to avoid loss of power density while reducing the image size. The ratio of the field of view of the optical probe 300 to the image size on the image plane 620 is approximately 6×, with approximately f/2 on the image plane at the fiber optic cable 330 to allow adequate depth of focus in the vicinity of the probe distal end 302.

Stray light is blocked from the image plane 620 at the end surface of the fiber bundle 330 by restricting the field of view of the optical probe 300 using an aperture such as 621 and by incorporating one or more additional apertures as desired. Stray light originates in many ways, including reflections off of distal window or lens surfaces and backscatter from the spatial mixer surface 304. The field limiting aperture in the system 320 is the aperture 621 over the image plane 620 at the end surface of the fiber bundle 330. Illustratively, aperture 621 is 3.9 mm in diameter and the fiber bundle 330 is 4.0 mm square. Another aperture in front of the lens 610 also is effective in blocking other stray light from areas outside of the primary field of view.

Figure 7:
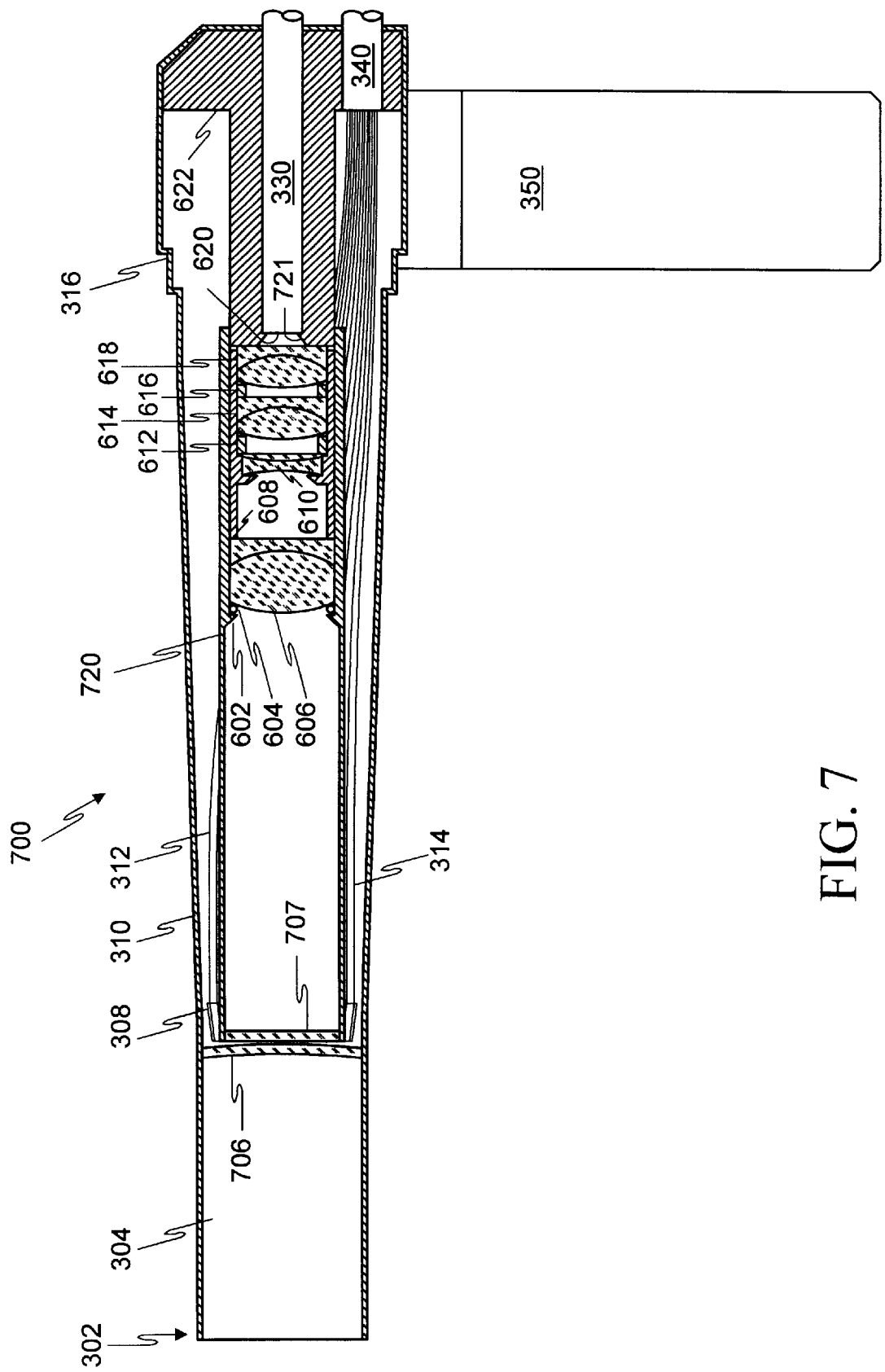
FIG. 7 is a plan side cutaway view of an optical probe like the optical probe of FIG. 6 but illustrating alternative elements of a radiation collection system along with some elements of the irradiation system.

A modification of the probe 300 and lens system 320 is shown in FIG. 7. The lens 306 at the distal end 302 of the probe is absent. Instead, a lens 706 is provided, which is recessed from the probe distal end 302 and mounted well within the spatial mixer 304 adjacent the lens system 720 and spaced 1 mm from the distal ends of the fibers of the bundle 340. An additional lens or window 707 is placed at the distal end of the lens system 720 to seal the entire lens system 720 and prevent dust from depositing on the optics or the optically black sidewall of the casing of the lens system 720. In applications involving pliable targets such as, for example, the human cervix, the probe 700 with an opening at the probe distal end 302 tends to stabilize more securely on the cervix when cervical tissue protrudes into the distal end segment 310. In this modification, the lens system 720 in conjunction with the lenses 706 and 707 do not form a telecentric lens system, but do achieve sufficiently uniform light collection to avoid the need for extensive optical correction. The lenses of the probe 700 illustratively are as follows. Lens 706 is preferably a concave-convex (meniscus) acrylic lens having a diameter of 25.0 mm, a thickness of 2.0 mm (lens thickness being measured along its optical axis), a distal surface radius of 82.97 mm, and a proximal surface radius of 76.20 mm. However, the lens 706 may instead be a flat acrylic window, if desired, which would occasion only a minor performance reduction. The protective window 707 is a flat silica cylinder having a diameter of 20.0 mm and a thickness of 3.0 mm. The other lenses and spacers of the lens system 720 are the same as the lenses and spacers of the lens system 320, except that the spacing between the object and lens 706 is 59 mm, between lens 706 and the protective window 707 is 1 mm, and between the protective window 707 and lens 606 is 80 mm. The lens system 720 is focused at a point about 2 mm inside of the distal end of the probe 700. This focal plane will usually be on cervical tissue for applications in which the target is the human cervix. Cervical tissue will likely protrude into the distal end segment 310 as a result of the natural shape of the cervix or light pressure applied to hold the probe 700 in place during use. The lens system 720 is also designed to focus the target image onto the image plane 620. The ratio of the field of view of the optical probe 700 to the image size on the image plane 620 is approximately 6×, with approximately f/2 at the image plane into the fiber optic cable to allow adequate depth of focus in the vicinity of the probe distal end 302.

Stray light is blocked from the image plane 620 at the end surface of the fiber bundle 330 by two principal apertures. One of the principal apertures in the lens system 720 is the aperture over the distal surface of the lens 610, which illustratively has a diameter of 6.4 mm and is spaced 1.00 mm from the distal surface of the lens 610. The other principal aperture in the lens system 720 is a field limiting aperture 721 over the image plane 620 at the end surface of the fiber bundle 330, which illustratively has a diameter of 3.9 mm and is spaced 2.00 mm from the image plane 620. Both apertures are active in controlling stray light, and since the lens system 820 is not telecentric, the aperture over the distal surface of the lens 610 defines the f-number or numerical aperture of the light collector.

Figure 8:
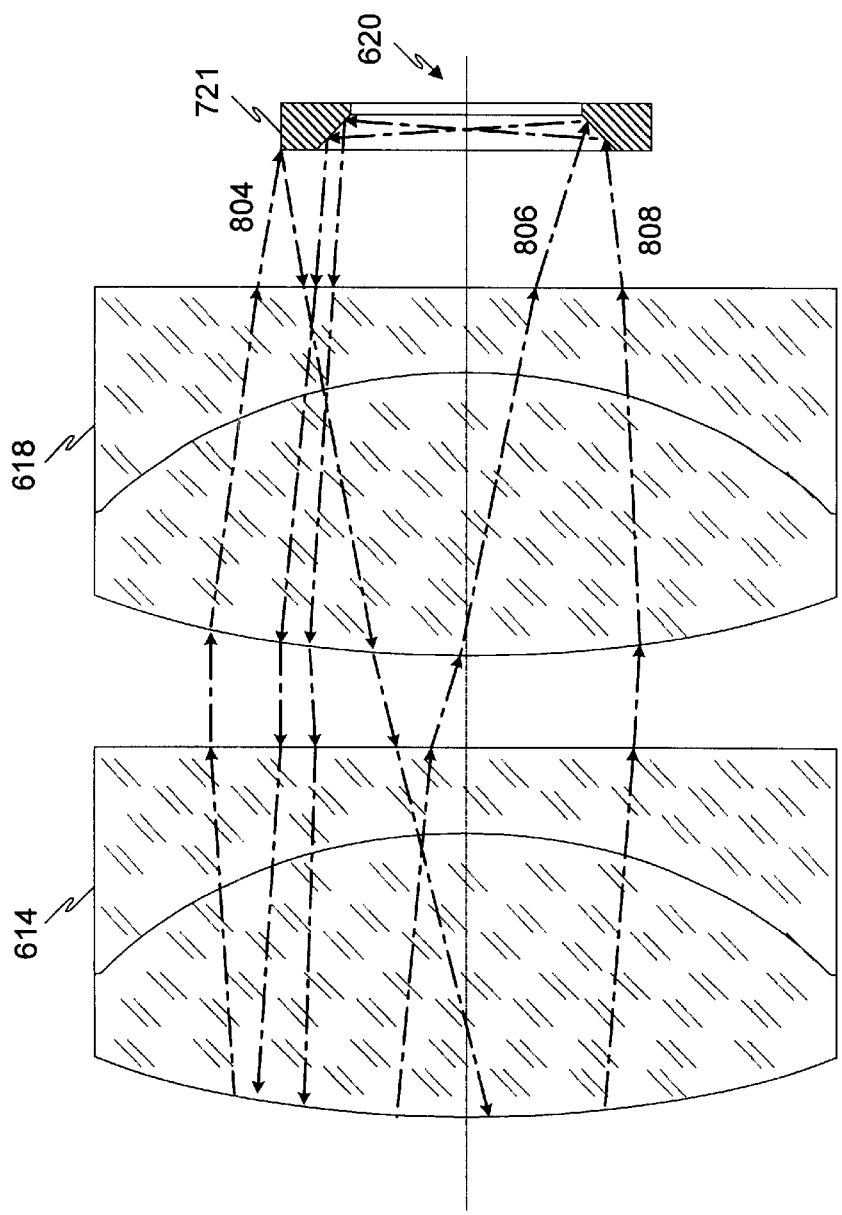
FIG. 8 is a ray trace diagram showing how reflected radiation rays from an intermediate window are blocked in a collection system with an aperture.

The principal apertures in the lens systems 320 and 720 include an angled inside annular surface, which redirects stray light away from the image plane 620. FIG. 8 shows how various illustrative rays that are reflected from a lens such as lens 706 of the optical probe 700 (FIG. 7) near the distal end 302 of the probe 700 either are blocked from the image plane 620 or redirected by the aperture 721. The inside annular surface of the aperture 721 is angled preferably 45° relative to the optical axis of the probe 700. Stray light coming through the lens system 720 from lens 706 and window 707 and from other sources and projecting just outside of the aperture either is reflected once and directed harmlessly through at least two lenses onto apertures and/or the inside optically black wall of the casing for the lens system 720, see, e.g., ray 804; or is reflected twice by two diametrically opposed 45° angled surfaces and exits the lens system 720 altogether, see, e.g., rays 806 and 808.

Combining the Light Collector and Irradiator

Preferably, care is taken to ensure good alignment of the optical axis of the light collector 210 (FIG. 2) with the axis of the spatial mixer 224 to avoid backscattered light from the spatial mixer 224 from entering into the field of view of the light collector 210. Generally, the field of view of the light collector 210 is narrow enough to exclude the inside wall of the spatial mixer 224 when alignment is proper, but otherwise is as wide as possible to permit viewing of an area of the target very slightly less than the overall diameter of the probe 200. Any misalignment would therefore allow reflected and backscattered light into the field of view of the probe 200 as a crescent of light.

Proper alignment of the optical axis of the light collector 210 with the axis of the spatial mixer 224 may be established and maintained in any suitable manner. For example, the distal probe section 310 and the proximal probe section 316 the probes 300 and 700 may be made of a single piece with the lens system 320 being rigidly retained therein. Alternatively, the distal probe section 310 and the proximal probe section 316 may be made of separate pieces, with the lens system 320 being rigidly retained therein by, for example, suitable structural members of the proximal probe section 316, and the distal probe section 310 being threaded and screwed into a prealigned threaded opening in the structural members of the proximal probe section 316.

Preferably, care is taken to ensure that the proper focal distance is maintained between the light collector 210 and the window 240. This focal distance is predetermined by optical design, and the proper focal distance is established by proper manufacture to tolerance and proper assembly and alignment of components. Alternatively, the focal distance may be mechanically variable, as in the case where the distal probe section 310 is threaded and screwed into a threaded opening in the proximal probe section 316, adjusted as needed, and fixed with any suitable device such as a set screw or various reference mechanical stops. The use of various stops enables repeating a setting. Alternatively, the focal length may be optically variable by incorporating a small motor, screw and guides into the light collector 210 to electrically remotely reposition the lens as required to achieve proper focus. These and other techniques for achieving proper focus are well known in the art and may be used as desired in connection with the generalized optical probe 200.

The axial placement of the distal end of the light collector 210 (FIG. 2) relative to the ring-like distal end of the light conductor 222 of the generalized probe 200 may be varied to achieve any desired design objective, provided that the uniform and diffuse nature of the light emitted at the window 240 is not adversely affected, and provided that any stray light going to the light collector 210 is controlled. For example, the distal end of the light conductor 222 may be placed generally in the plane of the distal end of the light collector 210, as in the case of the optical probe 300, behind the plane, or in front of the plane. Similarly, lens that optically participate with the light collector 210 in the collection of light may be located anywhere between the plane of the distal end of the light conductor 222 and the window 240, provided that the uniform and diffuse nature of the light emitted at the window 240 is not adversely affected. A lens such as lenses 306 and 706 used for mechanical protection and contamination control may also be located anywhere between the plane of the distal end of the light conductor 222 and the window 240, provided that any stray light from reflectance is controlled.

A lens placed in front of the distal end of the light conductor 222 generates stray light by reflecting a portion of the light from the light conductor 222. When the lens is located near both the distal end of the light conductor 222 and the distal end of the light collector 210, the light reflected by the lens tends to be outside of the field of view of the light collector 210. However, when the lens is located a distance from both the distal end of the light conductor 222 and the distal end of the light collector 210, a substantial amount of the light reflected by the lens tends to be inside of the field of view of the light collector 210 and is seen as disc-like artifacts. Various techniques are useful for reducing the effect of such reflections. For example, anti-reflection ("A/R") coatings may be used to reduce the amount of reflected light. Where the light being collected is of a different wavelength than the irradiation light, blocking filters may also be used to reduce the amount of reflected light detected.

A useful and particularly efficient approach for connecting the light conductor 222 and the light collector 210 to respectively a light engine (e.g., light engine 110 of FIG. 1) and a light detector (e.g., light detector 120 of FIG. 1) is continuous optical fibers from the light engine to the light conductor 222. However, due to the cost of this approach, other approaches may be better suited to certain applications. Alternative approaches include providing optical connectors on the probe, to which separate cables from the light engine connect. These separate cables may be made of optical fibers or other light conductors. For example, liquid light guides may be used for the irradiation light. Liquid light guides are flexible and have a cost advantage over optical fiber optics, but also tend to have a variable output which may need to be compensated for at the light detector. An illustrative compensation technique entails installing an edge-of-field light sensor component in the probe to monitor light output at the probe. Based on conditions of uniform light irradiation, a baseline of the liquid light guide is established. Then, the light output at the probe is monitored with the edge-of-field sensor components in conjunction with the light detector prior to each use to establish a calibration factor for each patient setup and to detect and correct for changes during each patient analysis. Continuous multipoint monitoring may be needed if there is spatial content to the transmission variations caused by movement of the cable.

Light Irradiation and Collection in Optical Probes Having Disposable Components

Figure 9:
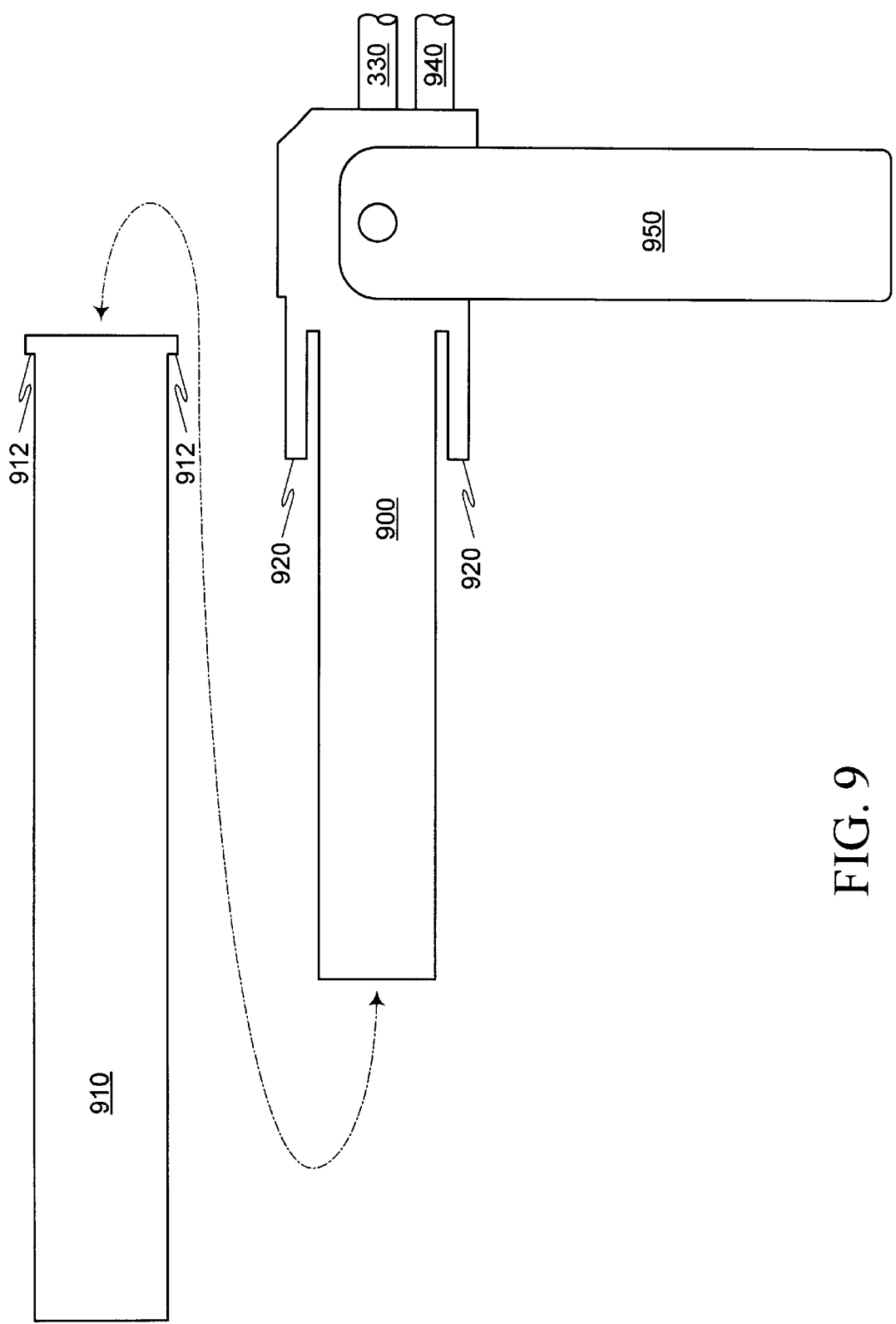
FIG. 9 is a side view of an optical probe showing the relationship between a reusable section and a disposable section thereof.

For applications in which avoidance of contamination is important, an optical probe may be designed as a one piece unit that is fully reusable after cleaning and decontamination, or as a two piece unit having one section with delicate and/or expensive components that is reusable without cleaning or decontamination and a protective durable section that is reusable with cleaning and decontamination, or as having a fully reusable section and a protective disposable section that is discarded after several or preferably one use and replaced with an identical but new and clean disposable. FIG. 9 shows an optical probe that has a fully reusable section 900 and a disposable section 910. A suitable connector component 920 on the reusable section 900 engages a suitable connector component 912 on the disposable 910 to hold the disposable 910 in place in proper alignment with the reusable section 900. A variety of connection mechanisms are suitable, including threaded fixtures, bayonet style fixtures, spring loaded clamps, fiction fit fixtures, and so forth.

Figure 10:
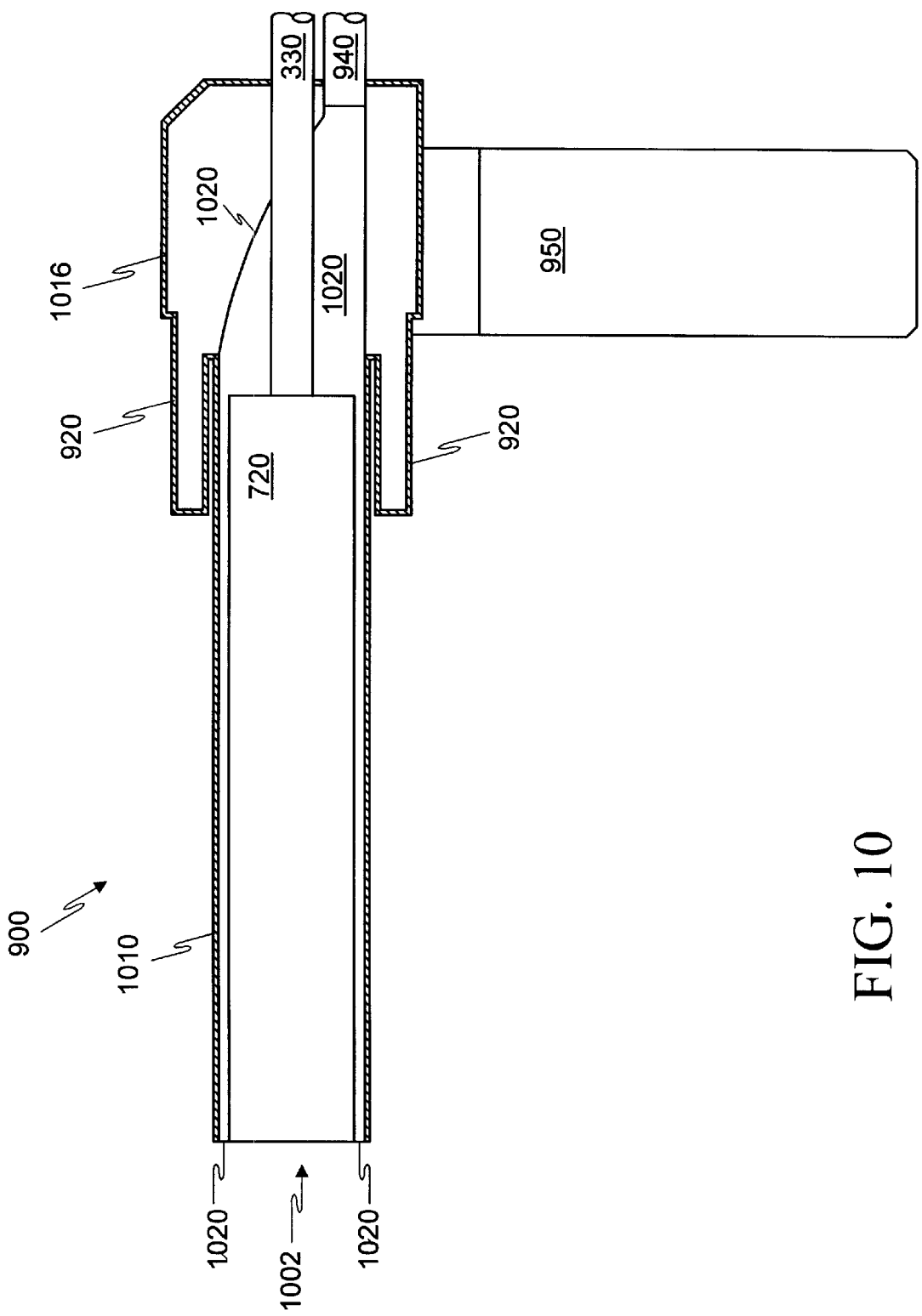
FIG. 10 is a plan cutaway side view of the reusable optical probe section of FIG. 9 that shows portions of an irradiation system and a radiation collection system, the probe being suitable for use in viewing, analyzing and/or treating material in the interior of cavities having restricted access through orifices or passageways.

FIG. 10 shows an example of the filly reusable optical probe section 900 suitable for use work with a disposable optical probe section such as shown in FIGS. 20–23. The probe 900 has a housing (shown in cross section) that includes a generally cylindrical projecting distal end section 1010 and a proximal end section 1016 to which a handle 950 is rotatably connected and from which fiber optic bundles 330 and 940 extend. The distal end section 1010 is generally cylindrical and illustratively about 18.5 cm in length and about 25 mm in diameter at the distal end 1002, the overall length of both sections 1010 and 1016 being about 28.5 cm. The distal end section 1010 and the proximal end section 1016 may be constructed as one piece or separate pieces connected in any desired manner, as by being threaded and screwed together, welded, joined with adhesive, clamped together, and so forth. The proximal end section 1016 is of any convenient shape for housing the fiber optics bundles 330 and 940 and to receive the handle 950, which extends illustratively about 19 cm from the proximal end section 1016. As the reusable probe section 900 does not contact the target, a wide variety of materials may be used for it, including all of the materials suitable Is for the probe 300 as well as materials that may not be suitable for the probe 300 because of, for example, patient contact restrictions in the case of medical applications.

The reusable probe section 900 includes a light collector, illustratively the lens system 720, and part of an irradiator, illustratively a light guide 1020. The spatial mixer preferably is included in the disposable. Although a light conductor made of fibers such as the fibers 340 in the probe 300 may be used instead of the light guide 1020, the light guide 1020 is made with preferably a generally cylindrical shape which does not require that the distal end section 1010 of the reusable probe section 900 be flared, thereby simplifying the manufacture of the disposables of FIGS. 20–23 that mount on the reusable probe section 900. The light guide 1020 is suitable for use in the optical probe 300 as well. Preferably, the 25 fiber bundle 330 is routed straight from the lens system 720 through the back of the proximal section 1016, and the light guide 1020 is provided with an opening through which the fiber bundle 330 passes. Alternatively, the light guide may be made to be symmetrical (not shown) while an assembly of mirrors, prisms, and the like may be used to route the image from the end of the lens system 320 through a notch in such a light guide and onto the image plane of an optical fiber bundle or connector (not shown) that is not coaxial with the lens section 720.

Figure 11:
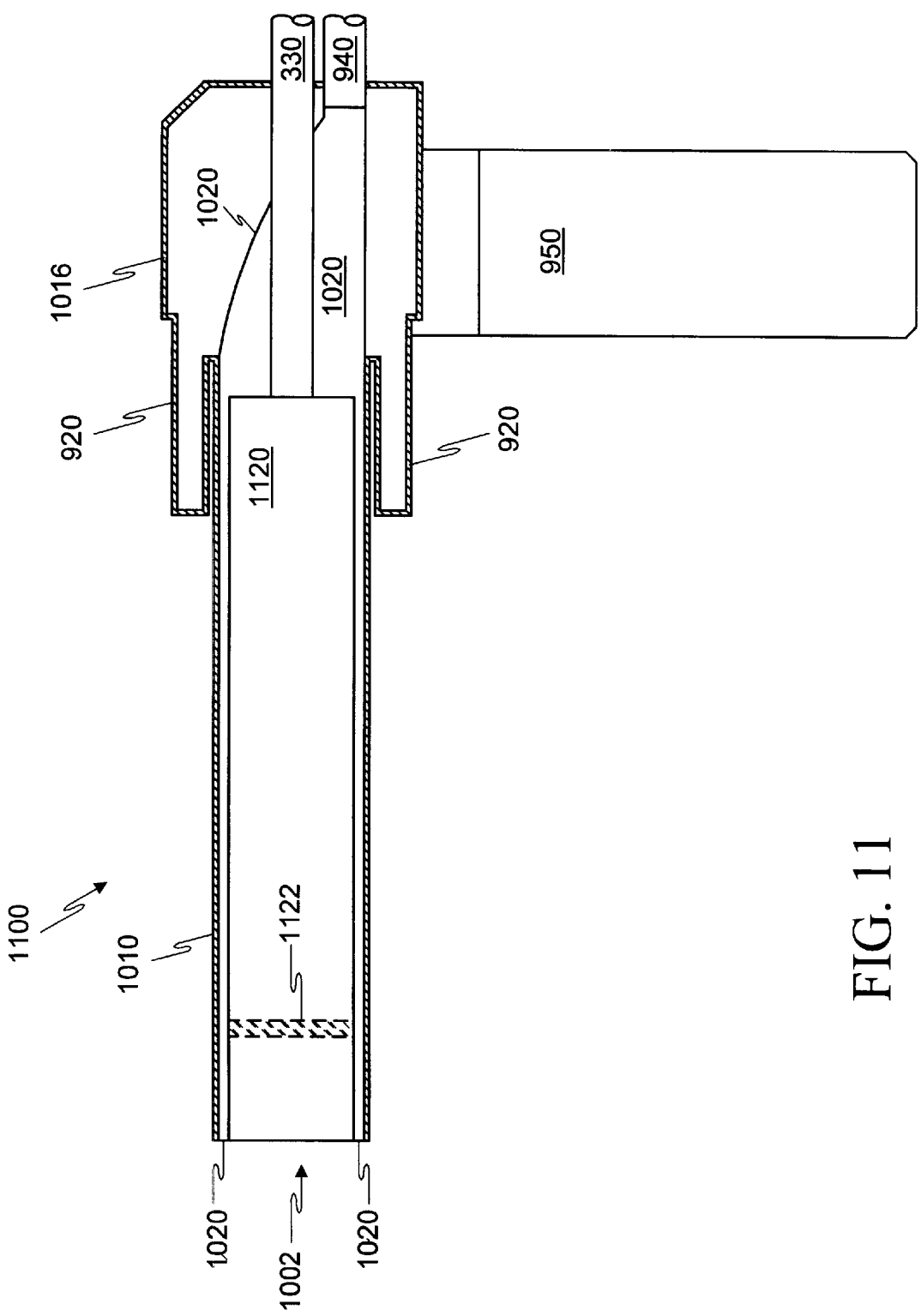
FIG. 11 is a plan cutaway side view of an alternative reusable optical probe section that shows portions of an irradiation system and a radiation collection system, the probe being suitable for use in viewing, analyzing and/or treating material in the interior of cavities having restricted access through orifices or passageways.

It will be appreciated that both the lens system 720 and the light guide 1020 in the reusable probe section 900 are illustrative, and that other lens systems, light guides, fiber arrangements, and combinations of lens, fibers, light guides, and so forth may be used instead. For example, FIG. 11 shows a reusable probe section 1100 in which the distal end 1002 is open and a lens or window 1122 is recessed into a lens system 1120, which is otherwise similar to the lens system 720.

The light guide 1020 may be manufactured by various techniques. For example, the light guide 1020 is made of fused silica, and may be manufactured in two pieces, including a short free-form light pipe coupled to a concentric cylindrical light pipe as shown in FIGS. 12–19, or in a single piece, such as a long free-form light pipe (not shown). Cladding, a vacuum deposited film, or another suitable material on the inside and outside surfaces of the fused silica is used to achieve internal light reflection, and the light pipe itself may be hollow or liquid filled instead of solid fused silica. These implementations may include means known in the art for improving light uniformity, including the use of a square clad rod light integrator or other such means of diffusing image artifacts at the input. Light is emitted from the light guide 1020 in a generally annularly continuous manner rather than as a ring of merging cones as from the ends of the fibers of the bundle 340 in the probe 300.

FIG. 12 shows a cross section along the axis of a cylindrical part 1200 of a two piece light guide, which is coupled to either free form section 1400 or free form section 1700 to complete the light guide. Section 1200 is a cylindrical light guide having a fused silica core 1204 contained within aluminum tubes 1202 and 1206. Illustratively, the cylindrical section 1200 is 129.5 mm (5.10 inches) long. The core 1204 has an inside diameter of 20.0 mm (0.787 inches) and an outside diameter of 24.0 mm (0.945 inches), and is fabricated using techniques well known in the art. The core 1204 is suitably clad to achieve a numerical aperture of preferably from about 0.25 to 0.4, and is then covered with an opaque coating to control stray light. Suitable cladding materials and opaque materials are available from various sources, including Chemat Technology Inc. of North Ridge, Calif., and Optical Polymer Research, Inc. of Gainesville, Fla. Aluminum tube 1206 has an inside diameter of 19.0 mm (0.748 inches) and an outside diameter of 19.9 mm (0.783 inches), while aluminum tube 1202 has an inside diameter of 24.1 mm (0.949 inches) and an outside diameter of 25.0 mm (0.984 inches). The aluminum tubes 1202 and 1206 preferably are black anodized, and are installed after cladding and coating is completed but before the ends of the fused silica core 1204 are ground and polished. A view of the proximal end of the section 1200 is shown in FIG. 13.

FIG. 15 shows a cross section along the axis of a free-form fused silica light guide section 1400 made using fabrication techniques well known in the art. Illustratively, the free form section 1400 is 45.7 mm (1.8 inches) long, and includes a suitably clad fused silica core 1404 which is placed within an aluminum tube 1402 before grinding, polishing and A/R coating of the ends thereof After cladding is applied, the core 1404 is potted inside of the aluminum tube 1402, using any suitable preferably non-fluorescent potting material. The core 1404 at the distal end of the section 1500 has an inside diameter of 20.0 mm (0.787 inches) and an outside diameter of 24.0 mm (0.945 inches), and at the proximal end has a diameter of 8.0 mm (0.315 inches) to mate up with a liquid light guide or fiber optic cable. A channel, which is referred to by the numeral 1408, is provided in the free form section 1400 for the passage of the fiber bundle 330 (FIG. 10). Illustratively, channel 1408 measures 15.2 mm (0.60 inches) wide and 27.9 mm (1.10 inches) long, and is spaced from the proximal end of the section 2000 by 27.9 mm (1.10 inches). A view of the distal end of the section 1400 is shown in FIG. 14, and a view of the proximal end of the section 1400 is shown in FIG. 16. The sections 1200 and 1400 are coupled using any suitable technique such as a index matching optical fluids, and suitable A/R coatings.

FIG. 18 shows a cross section along the axis of a free-form section 1700 made of a large number of cladded fused silica fibers using fabrication techniques well known in the art. Illustratively, about 24 cladded fibers are fused together to form the free form section 1700, the dimensions of which are the same as the free form section 1400. The section 1700 is potted inside of an aluminum tube 1702. A view of the distal end of the section 1700 is shown in FIG. 17, and a view of the proximal end of the section 1700 is shown in FIG. 19. The sections 1200 and 1700 are coupled using any suitable technique such as a index matching optical fluids, and suitable A/R coatings.

As can be seen from FIGS. 14–19, the use of openings in the free form sections 1400 and 1700 as well as the asymmetrical design thereof does not permit light to be uniformly annularly distributed therein. However, the annular uniformity of the light is improved by the cylindrical section 1200. Other measures to improve the annular uniformity of the light include varying the light guide wall thickness at the entrance transition or providing deflectors to deflect the light around the opening and then rotating and counter rotating the light around the fused silica core 1204. Using a square spatial mixer at the input may also be desirable for improving the annular uniformity of the light.

Disposables

A disposable 910 (FIG. 9) suitable for use with the reusable probe section 900 is generally elongated for mounting to the distal extension of the probe 900 and for protecting it from contamination from the target and surrounding materials, and contains an inside surface suitable for the spatial mixing of light and an optical element. The elongated portion of the disposable 910 may be rigid, pliable, or a combination of rigid and pliable sections, and may be made of various materials such as medical grade paper, plastic, synthetic rubber, aluminum, stainless steel, laminate, and other appropriate materials. The optical element may be a rigid or pliable body, including a solid flat optical window, a sheet of pliable material, a shaped lens, a conformal window such as a window having a nipple shaped to conform to the Os of the cervix, a fluid filled sac, or a combination thereof, and may be made of various materials such as plastic, fused silica, glass, quartz, and other appropriate materials. The spatial mixing surface may be a treated or coated inside surface of the elongated portion of the disposable, or may be another type of material or materials lining or embedded in the inside surface of the elongated portion of the disposable. For example, where the elongated portion of the disposable is a tube of extruded aluminum, the spatial mixing surface is formed by treating the inside surface of one end of the extruded aluminum tube with an acid etch and followed by anodization to create a light mixing surface. Alternatively, aluminum foil having a suitable spatial mixing surface may be applied to any suitable tube material. As used herein, "tube" refers to an elongated hollow shape of any desired cross section, including round, oval, elliptic, triangular, rectangular, other multiple facet geometries, "C" sections, free form sections, and any combination of the foregoing, whether varying or constant along the direction of elongation.

The material or materials used in the disposable 910 to protect the reusable probe section 900 from contamination constitute a fluid barrier, which is impervious to fluids typically found at the target site or that impedes such fluids throughout the intended period of use of the disposable. For example, materials suitable for medical applications include materials, that are impervious to mammalian body fluids, such as aluminum, plastic, fused silica, glass, and quartz, as well as materials that impede mammalian body fluids, such as medical grade paper.

Figure 20:
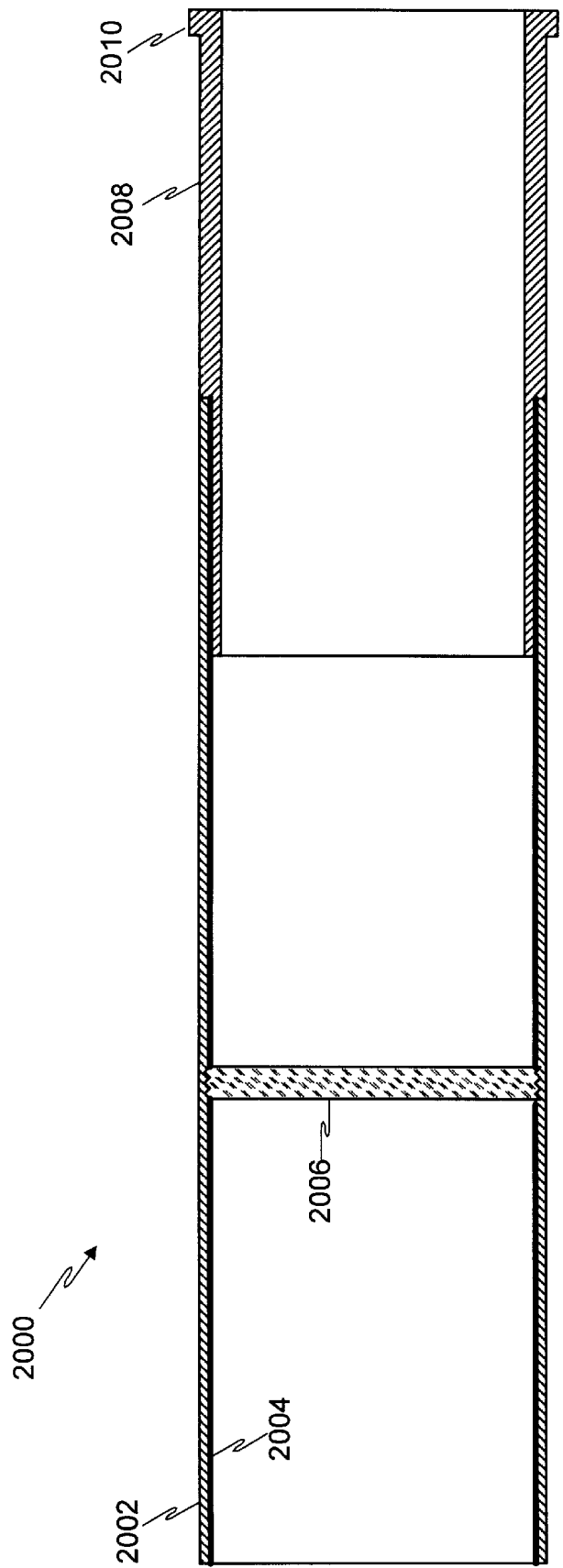
FIGS. 20–23 are cross-sections through various disposable probe sections suitable for use with the reusable probe section shown in FIGS. 10 and 11.

FIGS. 20–23 show various disposables that include medical grade paper in their manufacture. FIG. 20 shows a disposable 2000 that includes a tubular member 2002 of stiff medical grade paper which is fitted over a molded plastic base 2008. The thickness of the tube 2002 depends on its length, with a tube thickness on the order of 1.3 mm (fifty thousandths of an inch) being suitable for lengths required for cervical examination. The tube 2002 is connected to the base 2008 using any suitable technique, such as fixed with adhesive or press-fit. The base 2008 contains suitable connectors 2010 for connecting to the reusable optical probe section 900. A spatial mixer surface 2004 is provided by preferably aluminum foil paper that is applied to the inside of the paper tube 2002. A suitable aluminum foil paper is made of an aluminum foil liner about 0.01 mm (0.0003 inches) thick, for example, glued to 20 lb. natural Kraft backing paper, which is available from Custom Paper Tubes, Inc. of Cleveland, Ohio. Other aluminum foil papers are also commonly available with differing paper weights and foil types and thicknesses. For example, gold and nickel foils may be suitable in various applications depending on the irradiation wavelengths used. The aluminum foil paper is wound to achieve any desired internal seam. However, a spiral seam is preferred to a straight seam because a spiral seam tends to average any scattering and/or fluorescence that may be generated by the seam over the circumference of the spatial mixer to keep the intensity thereof below the detection threshold of the probe 900. The lens 2006 is threaded on its edge and is screwed into place from the back of the tube 2002 prior to connecting the tube 2002 to the base 2008. Other techniques for fitting the lens 2006 to the tube 2002 include press-fitting the lens 2006 into place, gluing the lens 2006 into place with a suitable adhesive, crimping the tube 2002 on both sides of the lens 2006, providing an annular trough on the edge of the lens 2006 and crimping the tube 2002 into the trough to engage the lens 2006, and so forth. Illustratively, the tube 2002 is about 10.2 cm (4 inches) long, the base 2008 is about 7.6 cm (3 inches) long, and the lens 2006 is UV acrylic or equivalent.

Figure 21:
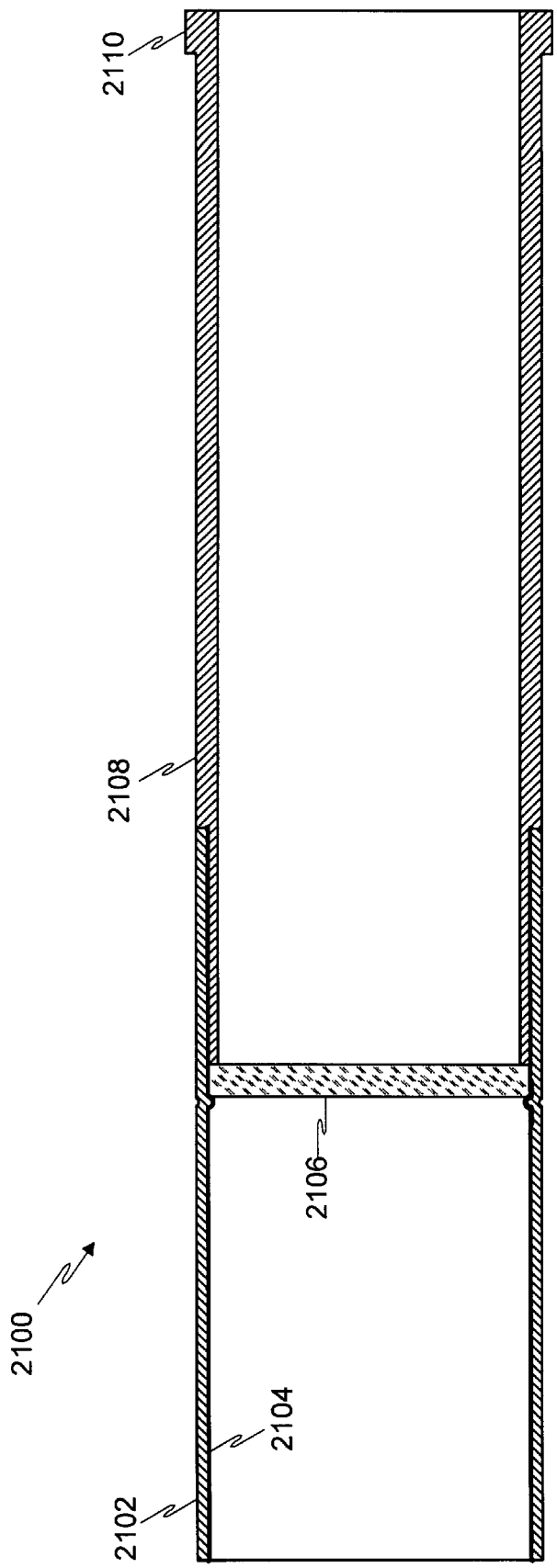

FIG. 21 shows a disposable 2100 that includes a tubular member 2102 of stiff medical grade paper with an internal spatial mixing surface 2104. A lens 2106 is pushed into place against a crimp or other type of retainer in the tube 2102, and the tube 2102 is pushed over a molded plastic base 2108 containing suitable connectors 2110. The molded plastic base 2108 presses against the lens 2106, firmly seating it against the crimp in the tube 2102.

Figure 22:
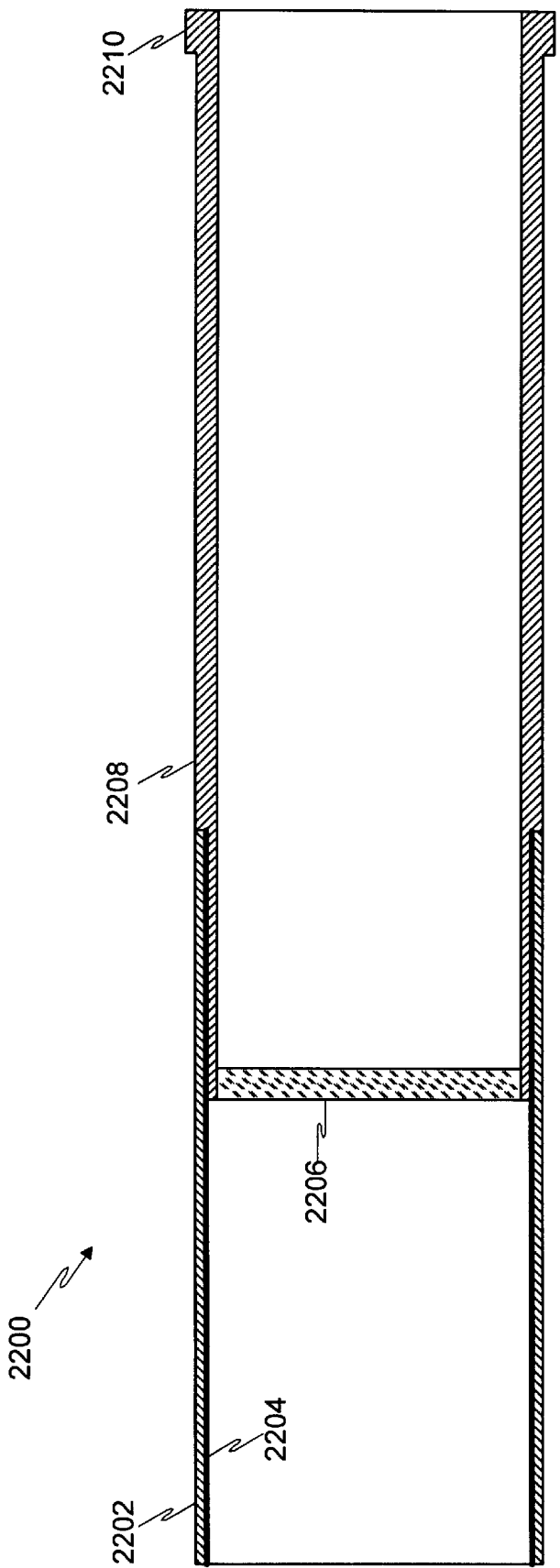

FIG. 22 shows a disposable 2200 that includes a tubular member 2202 of stiff medical grade paper with an internal spatial mixing surface 2204. A lens 2206 is press-fitted in proper alignment into a base 2208 or secured with adhesive, and the base 2208 is pushed into the tube 2202 and secured with a suitable adhesive.

Figure 23:
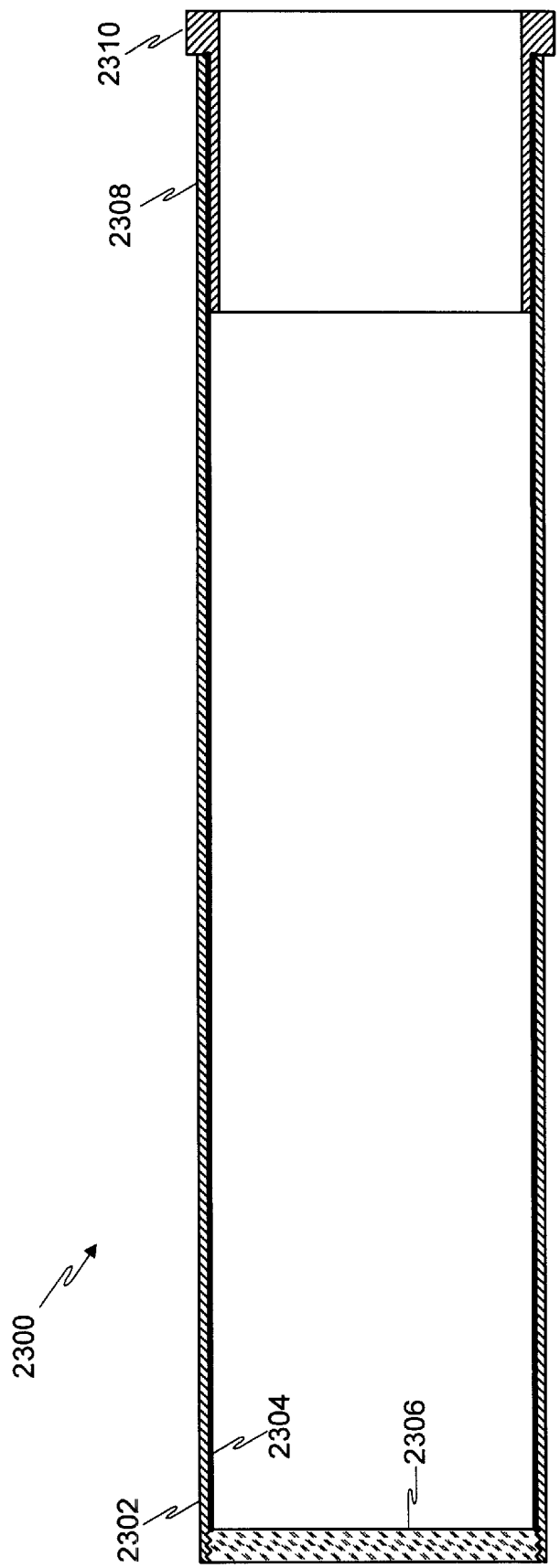

FIG. 23 shows a disposable 2300 having a lens 2306 mounted on the distal end thereof. The disposable 2300 includes a tubular member 2302 of stiff medical grade paper with an internal spatial mixing surface 2304. The tubular member 2302 is fitted over a molded plastic base 2308 containing suitable connectors 2310. A lens 2306 is mounted on the distal end of the disposable 2300 by screwing it into place or by using any other suitable technique such as press-fitting the lens 2306 into place, gluing the lens 2306 into place with a suitable adhesive, or crimping the tube 2002 to secure the lens 2306.

The various molded bases 2008, 2108, 2208 and 2308 shown in FIGS. 20–23 may be molded with a flare, if desired or if necessary to accommodate elements of the reusable probe section 900. Other materials and manufacturing techniques may be used instead of the various molded plastic bases 2008, 2108, 2208 and 2308; for example, extruded aluminum may be used.

Figure 24:
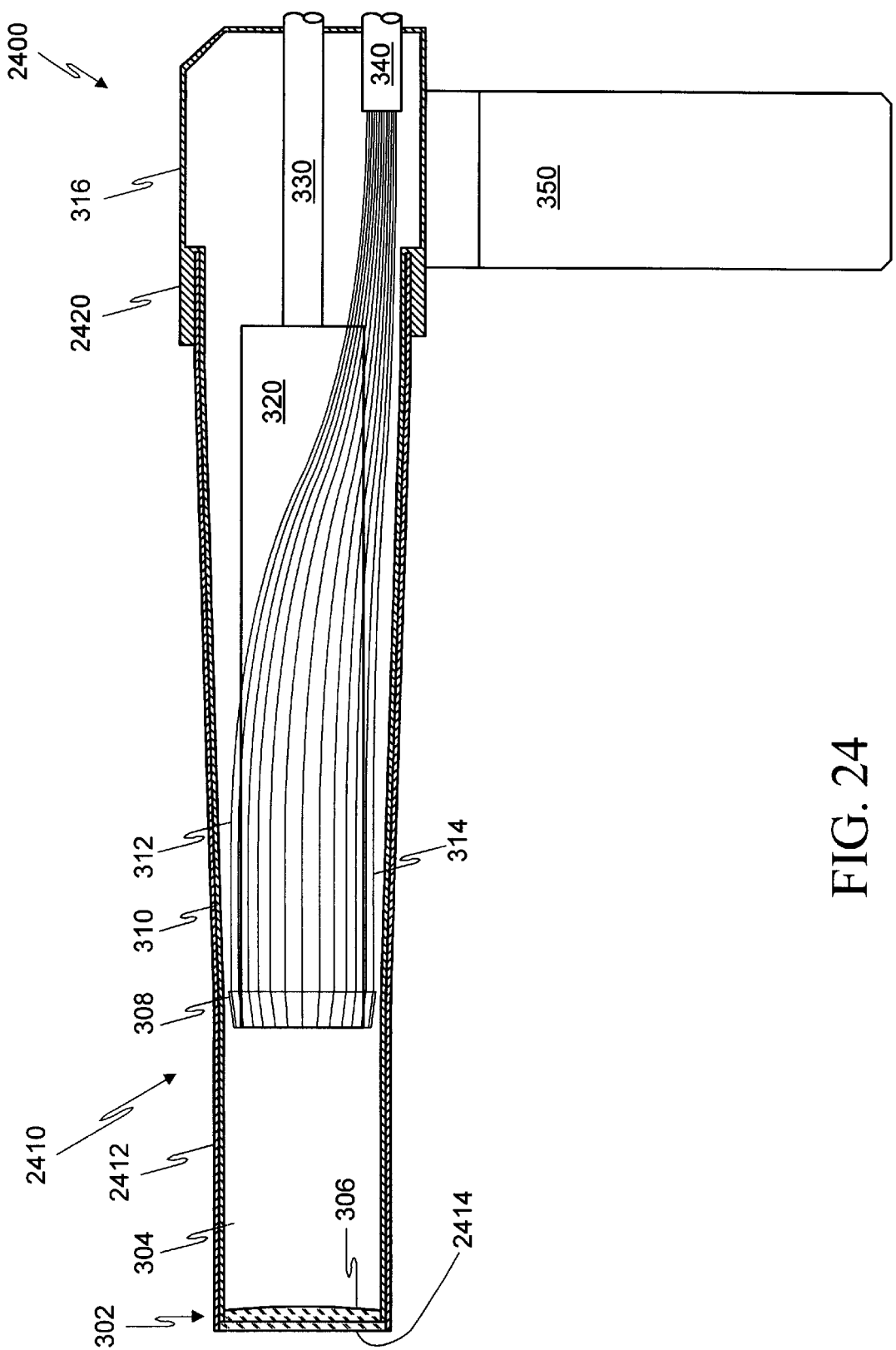
FIG. 24 is a side view of an optical probe showing the relationship between a reusable section and a disposable section thereof.

FIG. 24 shows an optical probe that has a fully reusable section 2400 and a disposable section 2410. The reusable section 2400 is similar to the optical probe 300, but includes a suitable connector component 2420 to engage a suitable connector component (not shown) on the disposable 2410 to hold the disposable 2410 in place in proper alignment with the reusable section 2400. It will be appreciated that various other light conductors, spatial mixers, and light collectors as described herein may be used instead of the fiber optics from the bundle 340, the mixer 304, and the lens system 320 shown in FIG. 24. The disposable 2410 does not contain a spatial mixer, which is part of the reusable section 2400 as shown by reference numeral 304. However, the disposable 2410 does include a protective elongated section, illustratively a flared tube 2412, and a protective optical window 2414, and is otherwise similar in construction and materials to the disposable 910. Suitable disposables are also described in U.S. patent application Ser. No. 08/823,044 entitled "Method and Apparatus for Calibrating an Optical Probe," which was filed Mar. 21, 1997 and names Peter McHenry and Arthur E. Schulze as inventors, and in U.S. patent application Ser. No. 09/027,403 entitled "Contact Window Having a Tilt Characteristic for Optical Probe," which was filed Feb. 20, 1998 and names Curtis K. Deckert as inventor, which hereby are incorporated herein in their entirety by reference thereto.

While the specific embodiments described herein are suitable for examinations of the human cervix, the invention is suitable for other tissue analysis by changing probe front optical-mechanical configuration, excitation wavelengths from the light source, detection wavelengths in the light detector, and diagnostic and control software on the computer. The probe size is scalable to function in different ways to analyze a wide variety of materials, including a variety of tissues. Any area of a body can be examined by applying a probe of the proper length with the necessary field of view, along with the proper modular changes to adjust the effective field of view. This technique can also be extended by the use of a flexible fiber optics interface to reach far into the body for visual examination and treatment.

While the specific embodiments of the spatial mixer described herein use a single finish or material to achieve adequate spatial mixing for many applications, some applications may call for an unusual type of spatial mixing. The type of spatial mixing may be varied by providing a variety of surface finishes or materials on the inside wall of the spatial mixer to optimize spatial mixing and/or regions of irradiation for a particular application. For example, in one arrangement (not shown) a cylindrical segment of the inside wall of the spatial mixer nearest the light source is a specular or reflecting surface, the middle cylindrical segment is a diffuse or scattering surface, and the last cylindrical segment nearest the distal end of the probe is an absorber. The absorber section may be eliminated where the field of view of the lens system is appropriately limited. Many suitable materials, finishes, and geometries are well-known to those of ordinary skill in the art to achieve a specular, diffuse or absorbing surface, as desired.

While many of the embodiments described herein include various values and dimensions, these are illustrative and other values and dimensions may also be useful. For example, the number, groupings, and size of the fibers in the irradiation system are illustrative.

What is claimed is:

1. An optical probe having a distally disposed optical window, comprising:
   a light collector having an axis of light collection passing through the optical window and a focal plane generally proximate the optical window;
   a light source having a light projection pattern about the axis of light collection; and
   a spatial mixer having a proximal end in optical communication with the light source, a distal end in optical communication with the optical window, and an axis of light projection passing through the optical window, the spatial mixer further having a light mixing surface partially intersected by the light projection pattern of the light source to establish a distribution of irradiation ray angles proximate the optical window that has a maximum away from normal and near-normal to the axis of light projection.

2. An optical probe as in claim 1 wherein the axis of light collection and the axis of light projection are coaxial at the optical window.

3. An optical probe as in claim 2 wherein the axis of light collection and the axis of light projection are coaxial through the spatial mixer.

4. An optical probe as in claim 1 further comprising a unitary body having a distal end containing the optical window and a proximate end, the light collector, the light source, and the spatial mixer being mounted to the body.

5. An optical probe as in claim 4 further comprising a handle coupled to the body near the proximal end thereof.

6. An optical probe as in claim 1 further comprising a body having a proximal section and a distal section containing the optical window.

7. An optical probe as in claim 6 further comprising a handle coupled to the proximal body section.

8. An optical probe as in claim 6 wherein the distal body section is removably coupled to the proximal body section.

9. An optical probe as in claim 8 wherein the distal body section is reusable.

10. An optical probe as in claim 8 wherein the distal body section is disposable.

11. An optical probe as in claim 10 wherein the spatial mixer is mounted to the distal body section and the light collector and the light source are mounted to the proximal body section.

12. An optical probe as in claim 10 wherein the light collector, the light source, and the spatial mixer are mounted to the proximal body section.

13. An optical probe as in claim 10 wherein the distal section is single use.

14. An optical probe as in claim 1 wherein the optical window is an opening in a distal end of the optical probe.

15. An optical probe as in claim 14 wherein the axis of light collection passes through the spatial mixer, further comprising an optical element disposed in the spatial mixer along the axis of light collection.

16. An optical probe as in claim 14 wherein the axis of light collection passes through the spatial mixer, further comprising an optical element disposed in the spatial mixer near the proximal end thereof and along the axis of light collection.

17. An optical probe as in claim 1 further comprising an optical element disposed in the optical window.

18. An optical probe as in claim 17 wherein the optical element is a flat rigid window.

19. An optical probe as in claim 17 wherein the optical element is a shaped lens.

20. An optical probe as in claim 17 wherein the optical element comprises a surface contoured to generally conform with the surface of a human cervix.

21. An optical probe as in claim 17 wherein the axis of light collection passes through the spatial mixer, further comprising another optical element disposed in the spatial mixer along the axis of light collection.

22. An optical probe as in claim 17 wherein the axis of light collection passes through the spatial mixer, further comprising another optical element disposed in the spatial mixer near the proximal end thereof and along the axis of light collection.

23. An optical probe as in claim 1 wherein the light collector comprises:
   a telecentric lens system; and
   a fiber optics bundle coupled to the telecentric lens system for carrying an image from the telecentric lens system to an external detector.

24. An optical probe as in claim 1 wherein the light collector comprises:
   a near-telecentric lens system; and
   a fiber optics bundle coupled to the near-telecentric lens system for carrying an image from the near-telecentric lens system to an external detector.

25. An optical probe as in claim 1 wherein the light collector comprises:
a non-telecentric lens system; and
means for correcting the non-telecentric lens system for non-uniformity across the field of view of the optical probe.

26. An optical probe as in claim 1 wherein the light collector has a field of view that excludes the mixing surface of the spatial mixer and includes substantially the entire area of the optical window.

27. An optical probe as in claim 1 wherein the focal plane of the light collector is distal to the optical window.

28. An optical probe as in claim 1 wherein the focal plane of the light collector is proximal to the optical window.

29. An optical probe as in claim 1 wherein the light source comprises a plurality of optical fibers arranged on all sides of the light collector, each of the fibers having an optical axis directed toward the optical window.

30. An optical probe as in claim 1 wherein the light source comprises a light guide arranged on all sides of the light collector, the light guide projecting light generally toward the optical window.

31. An optical probe as in claim 1 wherein the light projection pattern of the light source partially intersects the light mixing surface to establish a distribution of ray angles proximate the optical window that has a maximum near-parallel to the axis of light projection.

32. An optical probe as in claim 1 wherein the mixing surface comprises a light scattering surface.

33. An optical probe as in claim 1 wherein the mixing surface comprises a light scattering surface in combination with a specular surface over respective areas of the mixing surface.

34. An optical probe as in claim 1 wherein the mixing surface comprises a light scattering surface in combination with a light absorbing surface over respective areas of the mixing surface.

35. An optical probe as in claim 1 wherein the mixing surface comprises a light scattering surface in combination with a specular surface and a light absorbing surface over respective areas of the mixing surface.

36. An optical probe as in claim 1 wherein the mixing surface comprises a metallic foil.

37. An optical probe for examining, through an optical window therein, living tissue in the interior of cavities having restricted access through orifices or passageways, comprising:
a body having an elongated distal section containing the optical window, and a proximal section;
a lens system mounted in the body, the lens system having an optical axis passing through the optical window of the probe and a focal plane lying generally proximate to the optical window;
a light source mounted in the body about the lens system, the light source being coaxial with the lens system and having a direction of light projection generally toward the optical window; and
an elongated inside surface having one end disposed generally about the light source and another end disposed generally about the optical window, the inside surface comprising a light scattering surface and the light projection at least partially intersecting the light scattering surface to establish a distribution of ray angles proximate the optical window that has a maximum near-parallel to the optical axis of the lens system.

38. An optical probe as in claim 37 further comprising a lens mounted to the distal section along the optical axis of the lens system and at the optical window, wherein the lens system in combination with the lens is a telecentric lens system.

39. An optical probe as in claim 37 further comprising a lens mounted to the distal section along the optical axis of the lens system.

40. An optical probe as in claim 37 wherein the light source is a ring irradiator.

41. A disposable for an optical probe, the disposable having a distal end to contact a target having a fluid associated therewith and a proximal end to mount to a reusable optical probe section, the disposable comprising:
a body having a mounting surface toward the proximal end and a light mixing inside surface toward the distal end; and
an optical window element disposed within the body, the optical window element and the body proximal of the optical window element being barriers to the fluid.

42. A disposable for an optical probe as in claim 41 wherein the body comprises a tube and the light mixing inside surface comprises a metallic foil disposed on the inside of the tube.

43. A disposable for an optical probe as in claim 42 wherein the tube is paper.

44. A disposable for an optical probe as in claim 42 wherein the tube is plastic.

45. A disposable for an optical probe as in claim 42 wherein the tube is extruded aluminum.

46. A disposable for an optical probe as in claim 41 wherein the body comprises an extruded aluminum tube and the light mixing inside surface comprises an inside surface of the extruded aluminum tube having a light scattering surface treatment.

47. A disposable for an optical probe as in claim 41 wherein the body comprises a tube and the light mixing inside surface comprises a liner having a light scattering property disposed on the inside of the tube.

48. A disposable for an optical probe as in claim 41 wherein the body comprises a tube and the light mixing inside surface comprises an inside surface of the tube having a light scattering treatment.

49. A disposable for an optical probe as in claim 41 wherein the body comprises a tube and the mounting surface comprises a mechanical connector integral with the tube.

50. A disposable for an optical probe as in claim 49 wherein the tube is paper.

51. A disposable for an optical probe as in claim 49 wherein the tube is plastic.

52. A disposable for an optical probe as in claim 49 wherein the tube is extruded aluminum.

53. A disposable for an optical probe as in claim 41 wherein the body comprises:
a first tube, the light mixing inside surface comprising a metallic foil disposed on the inside of the first tube; and
a second tube coupled to the first tube, the mounting surface comprising a mechanical connector integral with the second tube.

54. A disposable for an optical probe as in claim 53 wherein the optical window element is mounted within the first tube.

55. A disposable for an optical probe as in claim 53 wherein the optical window element is mounted at a distal end of the first tube.

* * * * *